United States Patent [19]

Payne

[11] Patent Number: 4,604,518

[45] Date of Patent: Aug. 5, 1986

[54] DISPLAY ARRANGEMENT FOR COOKING APPLIANCE WITH POWER CONTROL USING HEATER ENERGY COUNTER

[75] Inventor: Thomas R. Payne, Louisville, Ky.

[73] Assignee: General Electric Company, Louisville, Ky.

[21] Appl. No.: 672,300

[22] Filed: Nov. 16, 1984

[51] Int. Cl.⁴ .............................................. H05B 1/02
[52] U.S. Cl. .................................... 219/506; 219/492; 219/483; 219/486; 219/453; 340/589; 307/38
[58] Field of Search ............... 219/497, 483, 486, 506, 219/501, 492, 453, 441; 307/39, 41, 38; 340/589, 588, 585

[56] References Cited

U.S. PATENT DOCUMENTS

| | | | |
|---|---|---|---|
| 3,612,826 | 10/1971 | Deaton | 219/453 |
| 3,852,728 | 12/1974 | Flagg, Jr. | 219/453 |
| 3,944,790 | 3/1976 | Tamano et al. | 235/92 T |
| 3,974,472 | 8/1976 | Gould, Jr. | 340/337 |
| 4,044,348 | 8/1977 | Huebscher | 219/453 |
| 4,121,204 | 10/1978 | Welch et al. | 340/337 |
| 4,443,690 | 4/1984 | Payne et al. | 219/506 |

OTHER PUBLICATIONS

European Trade Show Handout, Busch-Jaeger Elecktro GmbH, 3/2/81.

*Primary Examiner*—M. H. Paschall
*Attorney, Agent, or Firm*—H. Neil Houser; Radford M. Reams

[57] ABSTRACT

A display arrangement for a cooking appliance using a heater energy counter based power control system which provides a user discernible signal signifying that the appliance heating element has reached the steady state temperature associated with the user selected power setting. The heater energy counter is selectively incremented or decremented at a rate in accordance with the selected power setting such that the count rate is approximately proportional to the rate of increase or decrease respectively of the temperature of the heating element for the power setting selected. When so incremented and decremented the count of the counter provides an approximation of the actual heating element temperature. The display arrangement generates a user discernible signal when the count of the heater energy counter indicates that the associated heating element has approximately reached the steady state temperature for the selected power setting. In the illustrative embodiment the display comprises an LED array associated with each heating element. Each array is energized to provide a pattern representative of the power setting selected by the user for its associated heating element. When the count of the heater energy counter indicates that the steady state temperature for the selected setting has been reached, the display flickers for a predetermined period to signify to the user that the steady state condition has been reached.

2 Claims, 28 Drawing Figures

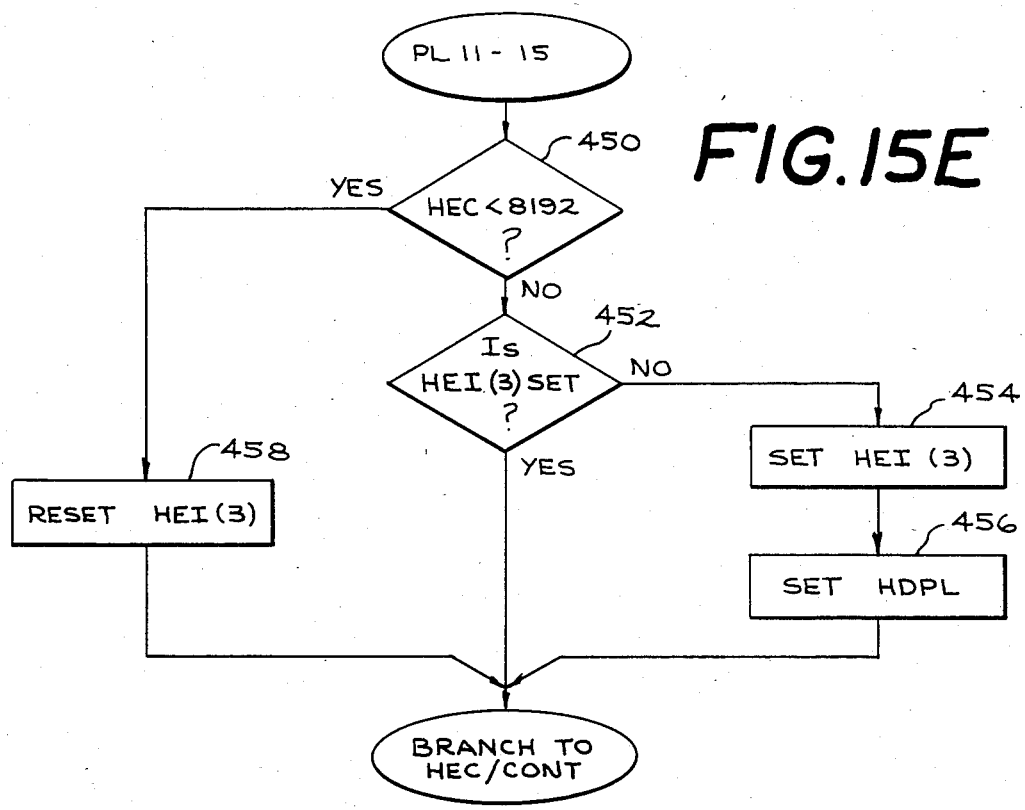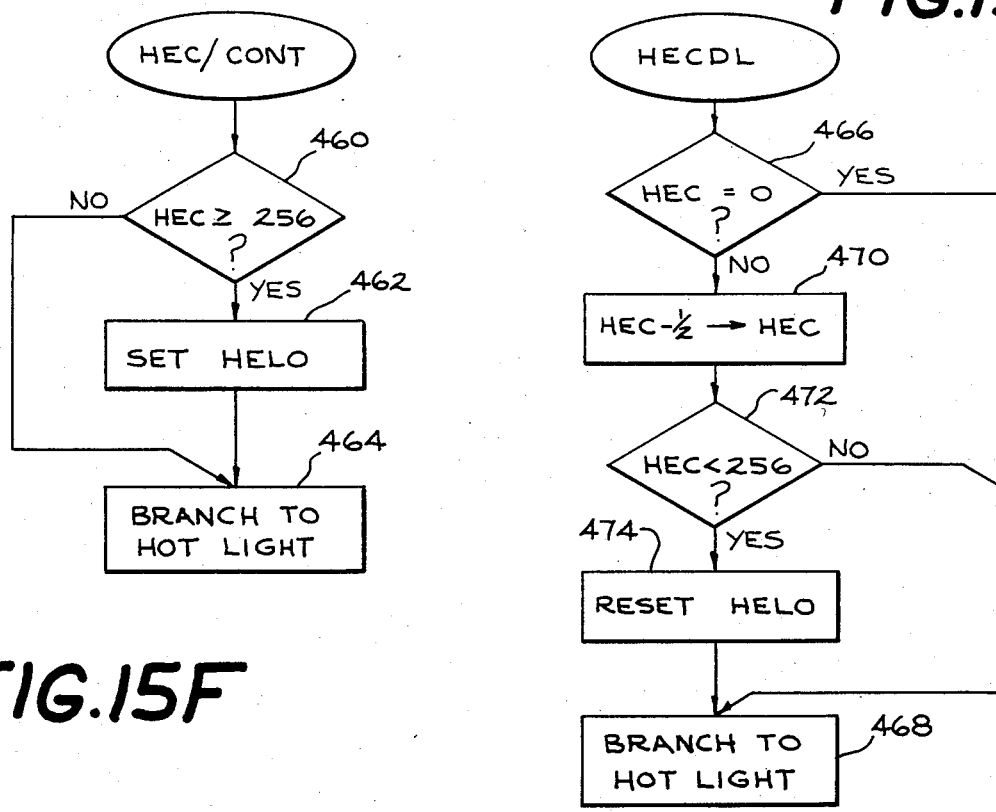

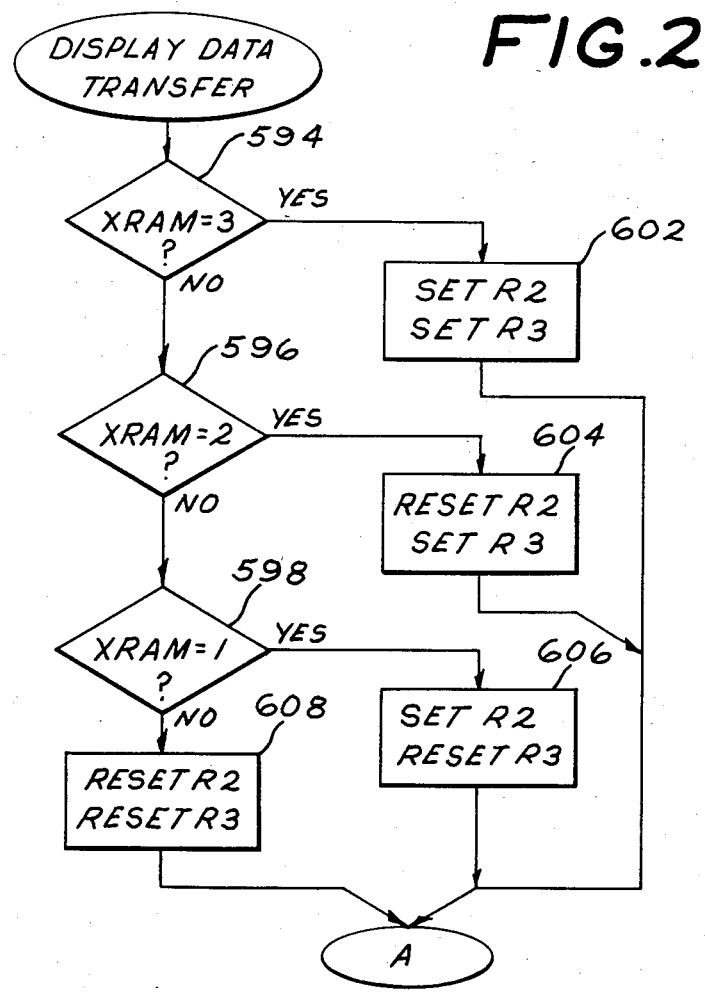

DISPLAY ARRANGEMENT FOR COOKING APPLIANCE WITH POWER CONTROL USING HEATER ENERGY COUNTER

CROSS REFERENCE TO RELATED APPLICATION

This application is related to commonly assigned co-pending application Ser. No. 438,622 now U.S. Pat. No. 4,551,618 entitled "Power Control for Cooking Appliance Incorporating Heater Energy Counter Means", which is a continuation-in-part of application Ser. No. 334,039 (now abandoned), filed in the name of Thomas R. Payne, which application is related to commonly assigned U.S. Pat. No. 4,443,690 entitled "Power Control for Cooking Appliance with Transient Operating Modes", filed in the names of Thomas R. Payne and Alfred L. Baker. The disclosures of the above-noted applications are hereby incorporated by reference.

BACKGROUND OF THE INVENTION

This invention is an improvement over the arrangement for monitoring the operating temperature of resistive heating elements in cooking appliances disclosed in the above-referenced U.S. Pat. No. 4,443,690 and co-pending application Ser. No. 438,622. In the disclosed arrangements a heater energy counter is used in lieu of a sensor to provide approximate heating element temperature information to the control system to implement various transient and steady state power control modes for a cooking appliance such as a range. However, in these systems no provision is made for informing the user of the status of the surface unit.

It would be desirable to provide a user discernible signal to indicate to the user that heating element being used has reached its steady state temperature level. Such information may be of use to the user in certain cooking operations.

It is therefore an object of the present invention to provide an improvement to a control system for household cooking appliances employing resistive heating elements of the type which provides approximate heating element temperature information without temperature sensor feedback to provide a user discernible signal signifying that the heating element has reached the steady state temperature associated with the user selected power setting.

SUMMARY OF THE INVENTION

The present invention provides an improved arrangement for monitoring the approximate temperature of one or more resistive heating elements adapted for selective energization at one of a plurality of power levels in response to the selection by an operator of one of a plurality of power settings including OFF. The temperature monitoring arrangement includes a counter which is selectively incremented at a rate in accordance with the selected power setting such that the count rate is approximately proportional to the rate of increase of the temperature of the heating element for the power setting selected. The counter is decremented when the power setting is changed from a relatively higher power setting to a relatively lower power setting including the OFF power setting at a rate selected in accordance with the lower selected power setting such that the count rate is approximately proportional to the rate of decrease of the temperature of the heating element when the element is cooling down to the selected temperature from a higher temperature associated with a higher power setting. When so incremented and decremented, the count of the counter provides an approximation of the actual heating element temperature.

Display means responsive to the heater energy counter provides a user discernible signal when the count of the counter indicates that the associated heating element closely approaches or is approximately at the steady state temperature for the selected power setting.

BRIEF DESCRIPTION OF THE DRAWINGS

While the novel features of the invention are pointed out with particularity in the appended claims, the invention both as to organization and content will be more completely understood and appreciated from the following detailed description with reference to the drawings in which:

FIGS. 15A-15G are flow diagrams of the HEATER ENERGY COMPARE routine incorporated in the control program for the microprocessor in the circuit of FIG. 8;

FIG. 20 is a diagram figuratively illustrating the arrangement of display data in a portion of the RAM of the microprocessor in the circuit of FIG. 8; and FIGS. 21A-21B are flow diagrams of the DISPLAY DATA TRANSFER routine incorporated in the control program for the microprocessor in the circuit of FIG. 8.

DETAILED DESCRIPTION

A. Overview

Figure 1:
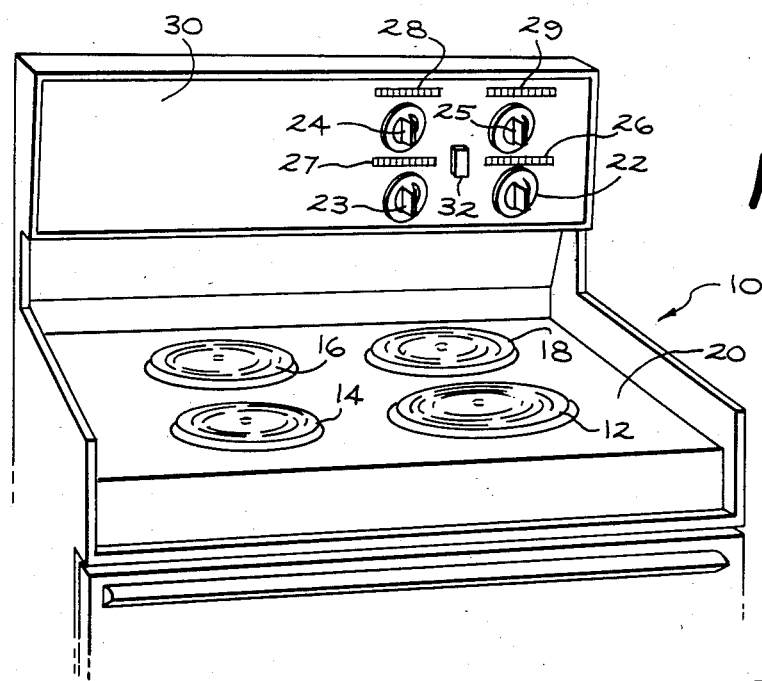
FIG. 1 is a front perspective view of a portion of an electric range illustratively embodying the temperature monitoring arrangement of the present invention.

FIG. 1 illustrates an electric cooking range 10 incorporating a control arrangement embodying the present invention. Range 10 includes four conventional electric surface resistance heating elements 12, 14, 16 and 18 supported from a substantially horizontal support surface 20. Manually operable rotary control knobs 22, 23, 24, and 25 are mounted to control panel 30. Control knobs 22, 23, 24 and 25 enable the user to select the desired power settings for heating elements 12, 14, 16 and 18, respectively. Displays 26, 27, 28 and 29, comprising fifteen element linear LED arrays, display the power setting selected for elements 12, 14, 16 and 18, respectively. A signal light 32 is mounted to control panel 30 to provide a visual indication to the operator that at least one of the heating elements is relatively hot.

Figure 2:
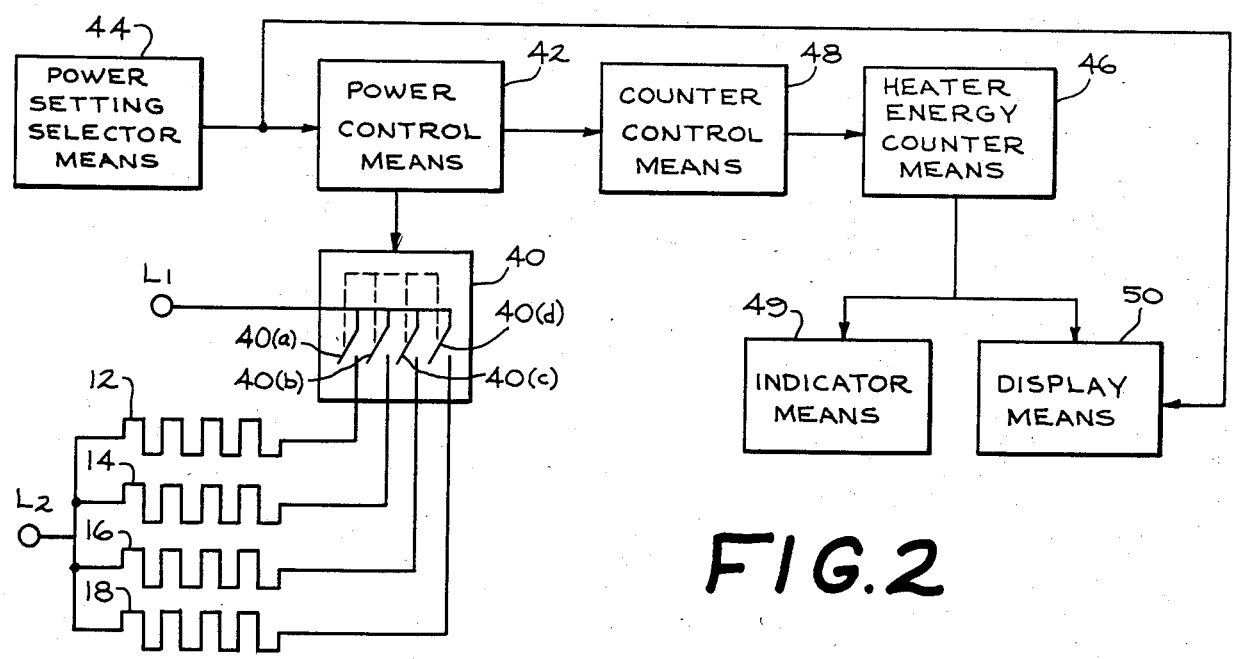
FIG. 2 is a greatly simplified functional block diagram of a control arrangement employed in the range of FIG. 1 incorporating the temperature monitoring arrangement of the present invention.

A generalized block diagram of the control arrangement for range 10 of FIG. 1 is shown in FIG. 2 wherein the heating elements 12, 14, 16 and 18 are energized by standard 60 Hz AC power signal which can be either 120 or 240 volts supplied to terminals L1 and L2. Elements 12, 14, 16 and 18 are connected electrically in parallel across lines L1 and L2. Power to the heating elements is controlled by switch means 40 connected in series with the heating elements. Switch means 40 includes separate switch means 40(a)–40(d) in series with each of the heating elements 12, 14, 16 and 18, respectively, to permit independent control of power to each of the heating elements. The switch means for each element is switched into and out of conduction in accordance with control signals generated by power control means 42.

Power control means 42 generates power control signals in accordance with the power setting selected by the operator for each heating element. Power setting selection means 44 provides power level control signals to power control means 42 representing the settings selected by manual manipulation of control knobs 22 through 25 of FIG. 1. Each of control knobs 22-25 enable the user to select one of 16 available discrete power settings including an OFF power setting for the corresponding heating element. Clearly, a greater or fewer number of power settings could be provided. Also, alternative means for power settings selection by the user, for example a digital keyboard, could be employed.

Figure 3:
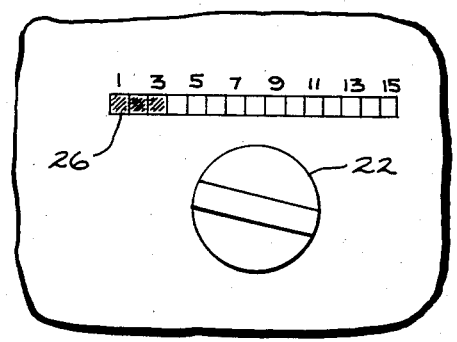
FIG. 3 is a greatly enlarged view of a portion of the panel of the range of FIG. 1 showing the details of one of the control knobs thereof with its associated display.

An enlarged view of control knob 22 and its associated display 26 is shown in FIG. 3 with the illuminated LEDs shaded. The first three segments of the display are illuminated signifying the selection of power setting 3.

Power control means 42 controls the percentage of time power is applied to each of the heating elements 12 in accordance with the power level settings selected by the operator.

In the illustrative embodiment, a predetermined control period comprising a fixed number of control intervals is employed as the time base for power control. Each heating element is switched into conduction for a particular number of control intervals during each control period, based on the corresponding operator selected power setting. The ratio of conductive control intervals to the total control intervals in the control period, expressed as a percentage, is referred to hereinafter as the duty cycle. Each control interval comprises eight cycles of the standard 60 Hz 240 volts AC power signal, corresponding to a period of approxiately 133 milliseconds. Each control period comprises 128 control intervals corresponding to a period of approximately 17 seconds duration. The durations for the control interval and for the control period were selected to provide a satisfactory range of power settings for desired cooking performance, which could be implemented using relatively slow relay switching devices and programmed to make efficient use of the microprocessor memory. It is understood that control intervals and control periods of greater or lesser duration could be similarly employed.

In carrying out the control scheme, the percentage of ON time or duty cycle for each power level is obtained by switching the particular heating element into conduction for a predetermined number of control intervals during each control period. TABLE I shows the percentage ON time and the number of conductive control intervals per control period for each of the 16 power settings. The duty cycles for each of the power cycles was determined empirically to provide the desired range of cooking temperatures for satisfactory cooking performance. It is understood that other duty cycles could be similarly employed.

TABLE I

| COL. 1 SELECTED POWER LEVEL | COL. 2 % ON TIME | COL. 3 ON CONTROL INTERVALS PER CONTROL PERIOD | COL. 4 OFF CONTROL INTERVALS | COL. 5 HEATER ENERGY COUNTER INCREMENT RATE (COUNTS PER ENERGIZED CONTROL INTERVAL) | COL. 6 HEATER ENERGY COUNTER INCREMENT RATE (COUNTS PER CONTROL PERIOD) | COL. 7 MAX. HEC COUNT |
|---|---|---|---|---|---|---|
| 0 | 0 | 0 | 128 | ½ | −64 | — |
| 1 | 2 | 3 | 125 | 5⅓ | 16 | 4096 |
| 2 | 3 | 4 | 124 | 5⅓ | 21⅓ | 4096 |
| 3 | 5 | 7 | 121 | 5⅓ | 37⅓ | 4096 |
| 4 | 8 | 10 | 118 | 5⅓ | 53⅓ | 4096 |
| 5 | 11 | 14 | 114 | 4 | 56 | 5120 |
| 6 | 14 | 18 | 110 | 4 | 72 | 5120 |
| 7 | 20 | 26 | 102 | 4 | 104 | 5120 |

TABLE I-continued

| COL. 1 SELECTED POWER LEVEL | COL. 2 % ON TIME | COL. 3 ON CONTROL INTERVALS PER CONTROL PERIOD | COL. 4 OFF CONTROL INTERVALS | COL. 5 HEATER ENERGY COUNTER INCREMENT RATE (COUNTS PER ENERGIZED CONTROL INTERVAL) | COL. 6 HEATER ENERGY COUNTER INCREMENT RATE (COUNTS PER CONTROL PERIOD) | COL. 7 MAX. HEC COUNT |
|---|---|---|---|---|---|---|
| 8 | 26 | 33 | 95 | 2⅔ | 88 | 6144 |
| 9 | 33 | 42 | 86 | 2⅔ | 112 | 6144 |
| 10 | 41 | 53 | 75 | 2⅔ | 141½ | 6144 |
| 11 | 50 | 64 | 64 | 2 | 128 | 8192 |
| 12 | 60 | 80 | 48 | 2 | 160 | 8192 |
| 13 | 72 | 96 | 32 | 2 | 192 | 8192 |
| 14 | 85 | 112 | 16 | 2 | 224 | 8192 |
| 15 | 100 | 128 | 0 | 2 | 256 | 8192 |

A heater energy counter 46 is provided for each heating element to provide proximate heating element temperature information for each of the heating elements without utilizing any type of temperature sensor. Counter 46 is incremented and decremented in such a way that the count of the counter is approximately proportional to the temperature or more fundamentally to the relative energy balance of the heating element.

Counter control means 48 responds to power control means 42 to selectively increment energy counter means 46 at one of a plurality of possible increment rates, each of which is approximately proportional to the rate of increase of the heating element temperature during the transient heat-up phase when the temperature of the heating element is rising to its operating temperature. The particular increment rate selected is determined by the power setting selected. Counter control means 48 is further operative to discontinue incrementing the energy counter 46 when the count of the counter at least equals a selected one of a plurality of maximum counts, each of which is approximately proportional to the steady state heating element operating temperature for corresponding power settings. The particular maximum count selected from this plurality of maximum counts is likewise determined by the power setting selected by the operator.

Counter control means 48 is further operative to decrement energy counter means 46. One of a plurality of predetermined decrement rates, each of which is approximately proportional to the rate of decrease of the heating element temperature during the cool-down phase as the heating element temperature decreases from the relatively high steady state operating temperature associated with the higher power setting to the relatively low, steady state operating temperature associated with the newly selected lower power setting. The counter control means discontinues decrementing the heating energy counter when the count is less than the predetermined maximum count corresponding to the selected lower power setting.

The increment rates (and decrement rate for the OFF setting) and the maximum counts for each power setting are shown in Cols. 6 and 7 respectively of Table I.

TABLE II

| COL. 1 SELECTED POWER LEVEL | COL. 2 % ON TIME | COL. 3 ON CONTROL INTERVALS PER CONTROL PERIOD | COL. 4 OFF CONTROL INTERVALS | COL. 5 HEATER ENERGY COUNTER DECREMENT RATE (COUNTS PER ENERGIZED CONTROL INTERVAL) | COL 6 HEATER ENERGY COUNTER DECREMENT RATE (COUNTS PER CONTROL PERIOD) | COL. 7 MAX. HEC COUNT |
|---|---|---|---|---|---|---|
| 1 | 2 | 3 | 125 | −2⅔ | −8 | 4096 |
| 2 | 3 | 4 | 124 | −2⅔ | −10⅔ | 4096 |
| 3 | 5 | 7 | 121 | −2⅔ | −18⅔ | 4096 |
| 4 | 8 | 10 | 118 | −2⅔ | −26⅔ | 4096 |
| 5 | 11 | 14 | 114 | −2 | −28 | 5120 |
| 6 | 14 | 18 | 110 | −2 | −36 | 5120 |
| 7 | 20 | 26 | 102 | −2 | −52 | 5120 |
| 8 | 26 | 33 | 95 | −1 | −33 | 6144 |
| 9 | 33 | 42 | 86 | −1 | −42 | 6144 |
| 10 | 41 | 53 | 75 | −1 | −53 | 6144 |
| 11 | 50 | 64 | 64 | — | — | 8192 |
| 12 | 60 | 80 | 48 | — | — | 8192 |
| 13 | 72 | 96 | 32 | — | — | 8192 |
| 14 | 85 | 112 | 16 | — | — | 8192 |
| 15 | 100 | 128 | 0 | — | — | 8192 |

The decrement rates selected for power settings 1-15 are shown in Table II. The decrement rate listed for each setting is the rate at which the heater energy counter would be incremented when a particular power setting is selected as a result of switching to that setting from a power setting in one of the higher power setting groups.

The increment and decrement rate values in Table I and II were selected by a process of empirical testing directed to finding values which provide satisfactory performance for the particular type of heating element to be used in the appliance. It is to be understood that the particular increment and decrement rate parameter selected depend upon the characteristics of the heating element itself, as well as the duty cycle at which it is operating. Thus, rates should be empirically determined for the particular system in which the counter arrangement is to be used.

B. Increment and Decrement Rate Parameter Selection Considerations

Figure 4:
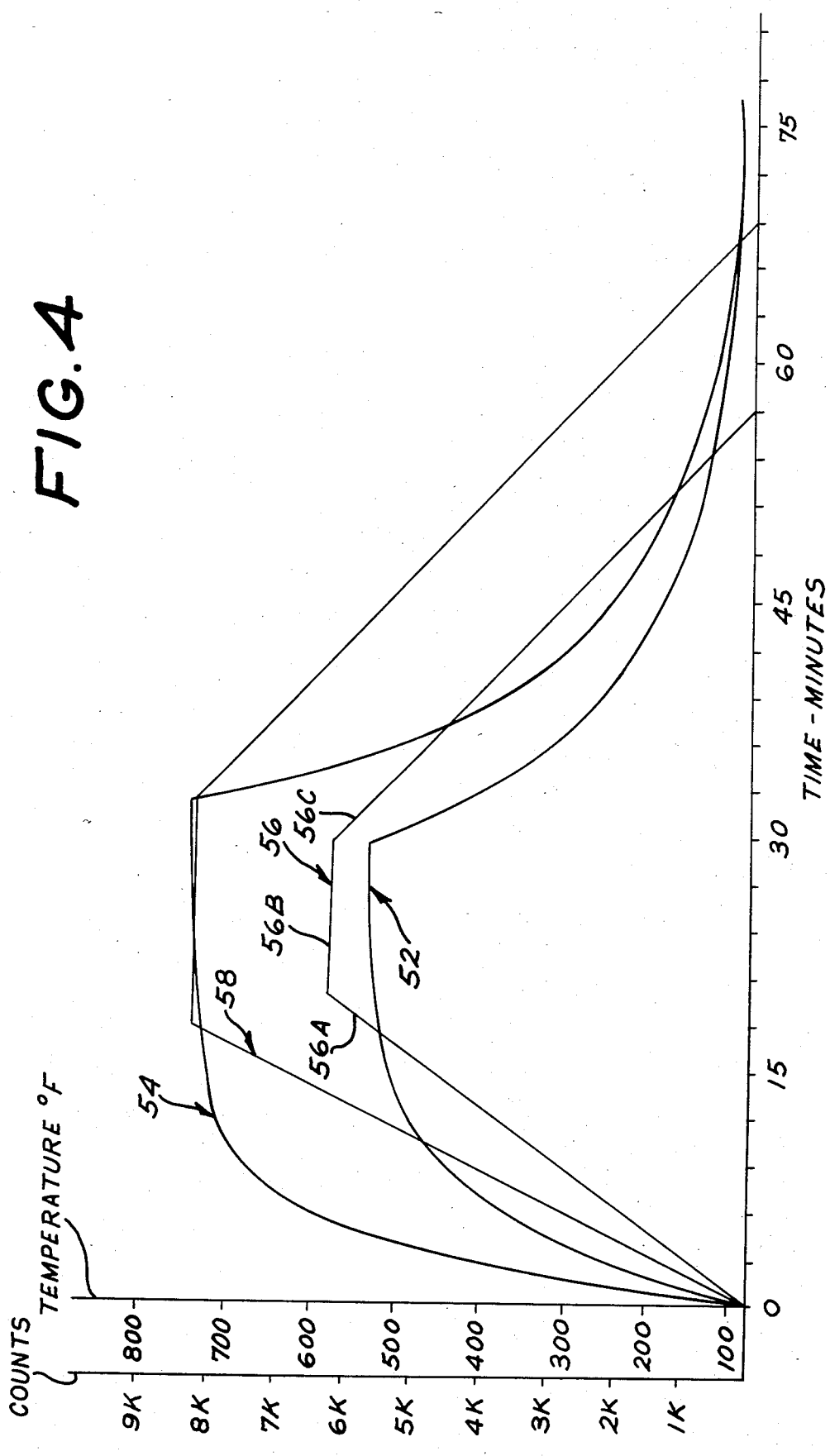
FIG. 4 is a graph depicting representative temperature versus time curves for the heating element of the type employed in the control arrangement of FIG. 2 for various power settings.

The temperature response of resistive heating elements of the type normally used for cooking apparatus when energized at room temperature generally can be characterized by heating curves comprising a heat-up phase and a steady state phase. When power is decreased or removed completely, the temperature response can be characterized by a cooling-down phase. A family of such curves for a typical heating element used as a surface unit in an electric range is shown in FIG. 4 for various power settings. The heating-up phase is represented by that portion of the curve characterized by a relatively rapid increase in heating element temperature; the steady state phase is represented by that portion of the curve characterized by a relatively constant temperature; and the cool-down phase is represented by that portion of the curve characterized by a relatively rapidly decreasing temperature following deenergization of the heating element. Temperatures shown are those measured at the inside of a cooking pan which is in contact with the heating element. The heating element is at room temperature when it is first energized and the appropriate power level is applied until the steady state temperature is reached. The heating element operates at this steady state level until power is removed at which time the heating element cools down to room temperature. To a first degree of approximation for most conventional cooking utensils, the slopes of the heating curves are independent of load conditions. The approximate response to changes in power settings can be determined from these curves by finding the curve corresponding to the new setting, starting from the temperature point representing the temperature of the element when the setting is changed.

The temperature of a heating element reflects the net energy balance of the heating element. When power is initially applied to the heating element at room temperature, energy is being added to the heating element from the power supply at a rate greater than the heating element dissipates the energy through radiation and conduction by heat transfer to the surroundings, resulting in a net increase in the energy level of the element. This net increase in energy level results in an increase in the temperature of the heating element. Eventually, the heating element reaches a temperature at which it is dissipating energy at a rate equal to the energy being provided from the power supply, at which time the temperature levels off, and the system operates in its steady state phase or mode. When the heating element is deenergized, the heating element dissipates energy resulting in a temperature decrease until the heating element temperature returns to room temperature.

By incrementing and decrementing a counter at rates which approximate the rates at which the net energy balance of the heating element increases or decreases, the count of the energy counter at any point in time is approximately proportional to the net energy level characterized by a particular temperature. Thus, it is possible to empirically determine a counter increment rate for each power setting which is approximately proportional to the rate of temperature increase or energy increase for the heating element for that particular power setting. By incrementing the counter at that rate when that power setting is selected the count of the counter is approximately proportional to the temperature of the heating element.

Curves 52 and 54 represent thermal curves for power settings 8 and 11, respectively. Curve 56 represents a linearized approximation of the curve for power level 12. The slope of curve portion 56A represents a counter increment rate of 88 counts per control period which is that implemented in the illustrative embodiment for the counter when power level 8 is selected. The horizontal portion 52B of the curve represents the maximum count of the counter for the power level selected, which in the illustrative embodiment is set at 6144 for power level 8, and the slope of portion 56C determines the rate for decrementing counter 46 when the heating element is de-energized. In the illustrative embodiment, this rate is 64 counts per control period.

The increment rate is selected which provides the desired net increase in the count at the end of each control period representing the approximate increase in temperature of the heating element during that control period for the duty cycle at which the element is operating. This is carried out by incrementing at a relatively slow rate during energized control intervals and holding the count constant during non-energized control intervals.

Figure 5:
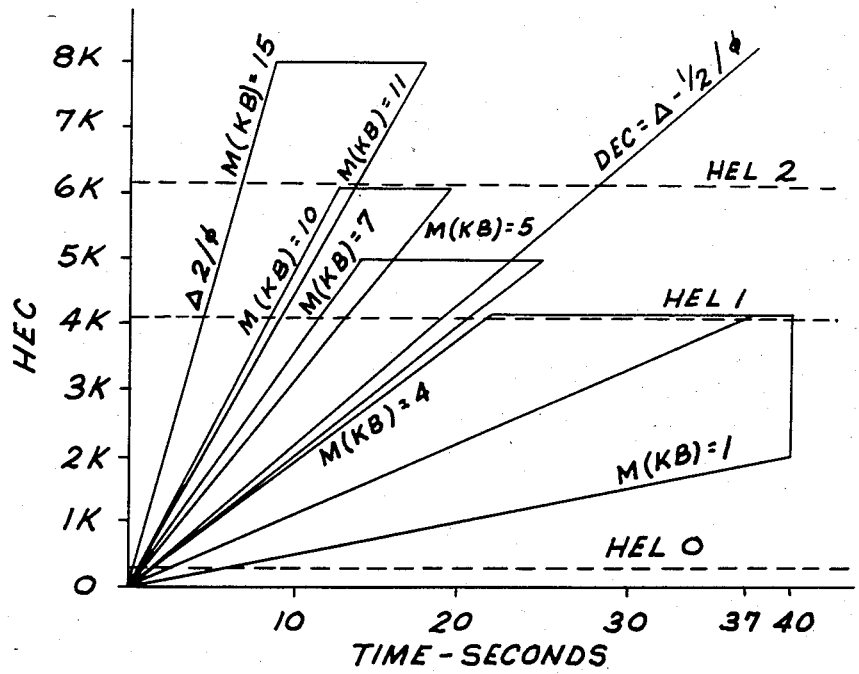
FIG. 5 is a graph depicting the count of the heater energy counter of the control arrangement of FIG. 2 versus time for various power settings.

The graph of FIG. 5 shows the effective increment rates for the various power settings employed in the illustrative embodiment to be desribed hereinafter. The number of counts which the energy counter is increment each energized control interval for the various power settings is shown in Table I. It will be noted that the count rate per control interval is higher for the low power settings than for the high power settings. This is done to take into account that the heating element operates more efficiently at low temperatures. That is, energization of the heating element for a given duration of time at low temperature results in a greater increase in temperature than energization of the heating element at a high temperature for the same duration of time. When operating at low settings, the heating element is energized for fewer control intervals per control period and the temperature of the element increases relatively slowly; however, for each energized control interval, the increase in temperature is greater than for the relatively high power setting. At the high power setting, the temperature of the unit increases rapidly to the level at which the temperature increase per control interval is less. Thus, the high rate per interval for low settings and low rate per interval for high settings provides a satisfactory approximation to the actual rate of temperature increase for the various power settings.

The increment rate per control period is selected to empirically approximate the rate of increase of the heating element temperature for each of the power settings by attempting to linearly approximate the temperature versus time curve for the heating element at each of the power settings. Various approximating techniques could be employed to arrive at the desired increment rate for each power settting, depending upon the degree of accuracy desired. The linear approximations expressed as constant increment rates per control period in Table I have been found to provide satisfactory results for the functions performed by the control arrangement of the present invention. It will be observed in the graph of FIG. 5 that there are certain overlaps. This results from a compromise between approximation accuracy and implementation economy. If greater accuracy is desired, rates which are more precisely tailored to each power setting could be empirically determined and readily implemented at the cost of a substantial increase in required microprocessor memory storage capacity. As shown in FIG. 5 and also in Table I, maximum counts are provided for various power settings 1-4 at a maximum count of 4096, settings 5-7 at a maximum count of 5120, settings 8-10 at a maximum count of 6144, and settings 11-15 at a maximum count of 8192. It has been empirically determined that the maximum counts provide satisfactory approximations of the maximum temperature of the heating element. Obviously, a more accurate approximation would result if a different maximum count were used for each individual power setting. Again, the improved performance would require additional memory storage capacity. It was determined, as a practical matter, that the additional programming code required to implement such a scheme was not justified in view of the satisfactory performance obtained by grouping in accordance with that shown in FIG. 5.

Since as hereinbefore described the power levels are grouped according to common maximum heating energy counter counts with settings 1-4 having a maximum count of 4096, settings 5-7 having a maximum count of 5120, settings 8-10 having a maximum count of 6144, and settings 11-15 at a maximum count of 8192, for power setting changes from higher to lower within any one group no incrementing of the counter is necessary. It is to be understood, however, that a more accurate approximation of the temperature could be provided by providing a different maximum count for each setting and decrementing down at a rate associated with the lower setting at the expense of additional memory capacity. However, satisfactory performance has been obtained by the present power setting groupings.

The decrement counts per control interval are the same for settings within each group; however, the rate per control period varies within each group due to the differing number of ON control intervals per control period for each setting. For each of the power settings, the decrement rate per control period is selected as a linear approximation of the temperature curve characteristic of the cool-down phase for the heating element. In this context, the cool-down phase means the period of heating element temperature transition from the relatively higher state operating temperature associated with the previously selected relatively higher power setting to the lower steady state operating temperature associated with the selected lower power setting resulting from the change in power setting from a higher power setting. Generally, for satisfactory approximation, the decrement rate is higher for the higher power settings. The reason for this is perhaps most easily understood by reference to the cool-down phase portions of the temperature versus time curves of FIG. 4. While the curves shown in FIG. 4 illustrate heating element cool-down following deenergization, the shape of the cool-down region of the curves are similar when changing from a higher to a lower power setting. It is apparent from FIG. 4 that during the cool-down phase the temperature decreases substantially more rapidly at the higher temperature than at the lower temperature. When the power setting is changed from a power setting in the 11-5 group to a power setting in the 8-10 group, the entire cool-down phase occurs in the relatively high temperature region of the temperature curve characterized by a relatively steep slope. Thus, the actual cool-down rate in this region is approximated by a relatively high decrement rate. On the other hand, when one of power settings 1-4 is selected, a significant portion of the cool-down phase occurs in the relatively low temperature region of the curve where the slope is less steep. This is true no matter what preceding higher power setting had been selected. Thus, the actual cool-down rate in this region is approximated by a relatively low decrement rate.

The information provided by heater energy counter 46 may be useful to the control system for performing a variety of functions. It may be desirable, for instance, to initiate the performance of a certain operating function when a certain operating condition which can be characterized by a certain energy level or temperature level exists. This condition can be detected for purposes of initiating the function by comparing the count of energy counter 46 to an empirically determined reference value. The desired function can then be initiated when the desired relationship is detected between the count and the reference value.

In the illustrative embodiment, referring again to FIG. 2, indicator means 49 provides a user discernible signal signifying that at least one of the heating elements is relatively hot. This is accomplished by comparing the count of heater energy counter 46 to a reference value selected to correspond to a particular temperature above which the heating element is uncomfortably hot to the touch. When the count at least equals this reference value, indicator means 50 generates a warning signal. In the illustrative embodiment indicator means 50 is provided in the form of indicator light 32. It was determined that it would be desirable to energize the hot light indicating to the user that the heating element was hot when the temperature of the heating element exceeded a temperature of 110° F. This temperature was selected as a reasonable transition temperature between relatively cool and relatively hot settings. Above this temperature, the heating element is at least uncomfortably hot to the touch. The heater energy count empirically found to be approximately proportional to this temperature for the illustrative embodiment is a count of 256. It is to be understood that a separate light for each heating element could readily be used as well. Also, other means for indicating a condition such as an audio signal generating means could be similarly employed. A significant advantage of this arrangement is that the indicator light remains on even after the heating element is turned off until the heater energy counter decrements down to the reference value, thereby providing an indication to the operator that the heating element remains hot even though the element has been turned off and is no longer being energized.

The control system of the illustrative embodiment also uses the heater energy counter information in implementing certain transient operating modes designated fast-heat and fast-cool. These modes are provided to reduce the time required for the heating element temperature to respond to changes in the power level selection. This aspect of the control system is disclosed in greater detail in U.S. Pat. No. 4,443,690.

In accordance with the present invention use is made of the heater energy counter information to provide a user discernible signal indicating that the steady state temperature corresponding to the selected power setting has been reached. Display means 50 (FIG. 2) responds to both the power setting selector means 44 to display the selected power setting and to the heater energy counter 46 to signify that the steady state temperature for the selected power setting has been reached.

C. Functional Operation of the System

Figure 6:
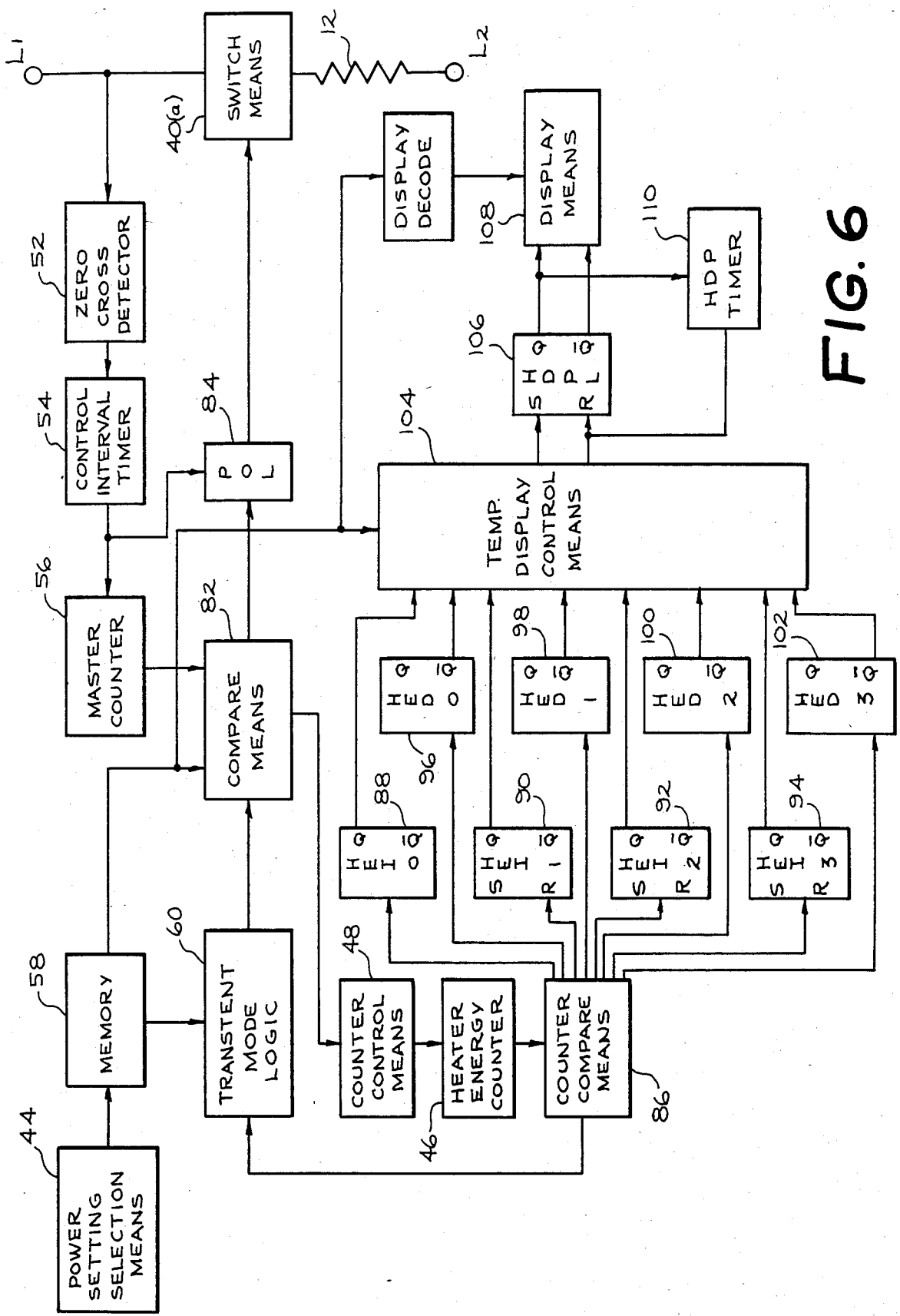
FIG. 6 is a more detailed functional block diagram of the control arrangement of FIG. 2 for a single one of the heating elements.

The functional block diagram of FIG. 6 which illustrates a control system for a single heating element, will be referred to in describing in greater detail the functional operation of the control system embodying the temperature monitoring the display arrangement of the present invention. It is to be understood that the operation of the system is the same for multiple heating elements requiring merely a duplication of the control arrangement shown for each additional heating element.

Control system operation is synchronized with the zero crossings of the power signal applied to terminals L1 and L2. Zero crossing detector 52 monitors the power signal and generates a zero crossing pulse upon each detection of a zero crossing of the power signal. The control interval is defined by control interval timer 54 which counts the zero crossings and generates an output pulse once every eight cycles of the power signal corresponding to once every 16 counts or zero crossings. The output pulse from control interval timer 54 marks the beginning of each control interval. Master Counter 56 establishes the duration of each control period by repetitively counting a predetermined number of control intervals and resetting. In the illustrative embodiment, Master Counter 56 counts from zero to 128 and resets, thereby establishing the duration of the control period at approximately 17 seconds. The control logic is completely cycled through once at the beginning of each control interval during which a switch means triggering decision for each heating element is made for that control interval.

In carrying out the power control scheme, the output from power setting selection means 44 representing the current power level selected by the operator is read into memory 58 at the beginning of each control interval. Memory 58 includes a temporary storage location KB (not shown) and a permanent storage location M(KB) for storing control signal data. The newly entered digital control signal from the power level selection means is stored in temporary location KB, until Transient Mode Logic 60 completes the testing of this signal for implementation of transient modes if appropriate. Upon completion of the testing process, the signal stored at KB is transferred to permanent storage location M(KB) in memory where it is retained indefinitely until replaced by a control signal representing a subsequently selected power setting. In the balance of this description, the designations KB and M(KB) are used interchangeably to refer to the memory locations, as well as the signal stored at these locations, as is customary in the art. In each instance, the meaning will be apparent from the context.

In order to determine when to initiate the transient operating modes, Transient Mode Logic 60 monitors KB to determine whether the new power setting is an OFF setting, the same setting as the previous setting, or a change in the setting to a higher power level or a lower power level. When the new setting is the same as the original setting, that is, when KB is the same as M(KB), indicating no change in power setting, M(KB) is unchanged and control proceeds accordingly. When a change in power setting from a power level to an OFF setting is detected, KB is read into M(KB) replacing the previously entered setting. When KB is different from M(KB) and is not an OFF setting, further testing on KB is performed to distinguish between an increase in the power setting and a decrease in the power setting in order to initiate the appropriate transient operating mode. Transient Mode Logic 60 includes a plurality of transient mode controlling latches, including the Instant On Latch (IOL), the Fast-Heat Latch (FHL) or the Fast-Cool Latch (FCL) (not shown), and Heater Energy Latches which operate in a manner described in detail in the above-referenced Payne et al disclosure to provide transient mode control.

Duty cycle control of the heating element is carried out by Comparing Means 82 which compares the count of Master Counter 56 with a digital power signal representing the power setting to be implemented, to determine whether to energize the heating element during the next control interval. This digital power signal digitally represents the actual number of ON control intervals per control period for the power level to be implemented. The number of ON control intervals per control period, represented by the digital power signal for each power setting is shown in Col. 3 of Table I. It will be recalled that Master Counter 56 is incremented once each control interval repetitively counting from zero to 127. Comparing Means 82 generates an output signal to set the Power On Latch (POL) 84 when the count of Master Counter 56 is less than the digital power signal. Thus, for example, when the heating element is operated at power level 6 the element is to be energized for 18 control intervals during each control period. For power level 6, the power signal is a digital representation of the number 18. During each control period, the count of Master Counter 56 will be less than the power signal for counts zero through 17 corresponding to 18 counts and greater than or equal to the power level signal for the remaining 110 counts of the control period. Thus, the Power On Latch will be set for the first 18 control intervals of each control period.

During steady state operation, the digital power signal represents the actual power level selected, M(KB). However, when one of the transient operating modes is being implemented, Comparing Means 82 substitutes a value for the digital power signal other than that corresponding to the actual power level selection signal depending upon which transient mode is being implemented.

As mentioned briefly hereinbefore, the control arrangement of the present invention includes a Heater Energy Counter 46 to indirectly monitor the approximate temperature of the heating element. Counter control means 48 responds to the digital power signal employed by Comparing Means 82 by incrementing and decrementing Heater Energy Counter 46 at a rate determined by that power signal. Counter control means 48 is operative to discontinue incrementing or decrementing Heater Energy Counter 46 upon reaching a predetermined maximum count determined by the power setting at which the element is being energized and operated. Counter comparing means 86 is operative to compare the count of Heater Energy Counter 46 to several different predetermined threshold counts corresponding to threshold temperatures for controlling the hot light indicator and implementing the transient modes.

In addition the Counter Compare Means 86 compares the count of Heater Energy Counter with a total of eight threshold levels in the implementation of the temperature display function. Two thresholds, one used when incrementing and one used when decrementing, are associated with each of the four maximum counts for the four groups of power settings. Latches HEI0–HEI3 and HED0–HED3 are associated with the maximum counts for power settings 1-4, 5-7, 8-10, and 11-15 respectively. The appropriate one of latches HEI0–HEI3 is set by counter compare means 86 when incrementing the Master Counter. The appropriate one of latches HED0–HED3 is reset when decrementing the Master Counter when the power setting is changed from a relatively higher setting to a relatively lower setting.

It is desired when the steady state count is reached that the display only be enabled once to inform the user that the steady state condition exists. However, due to the manner in which the Master Counter counts, under steady state conditions the count oscillates about the maximum count. Hence, the appropriate one of latches HEI(0)–(3) is set at a count slightly less than the maximum count. Similarly, the appropriate one of latches HED(0)–HED(3) is reset at a count slightly greater than the maximum count.

Figure 7:
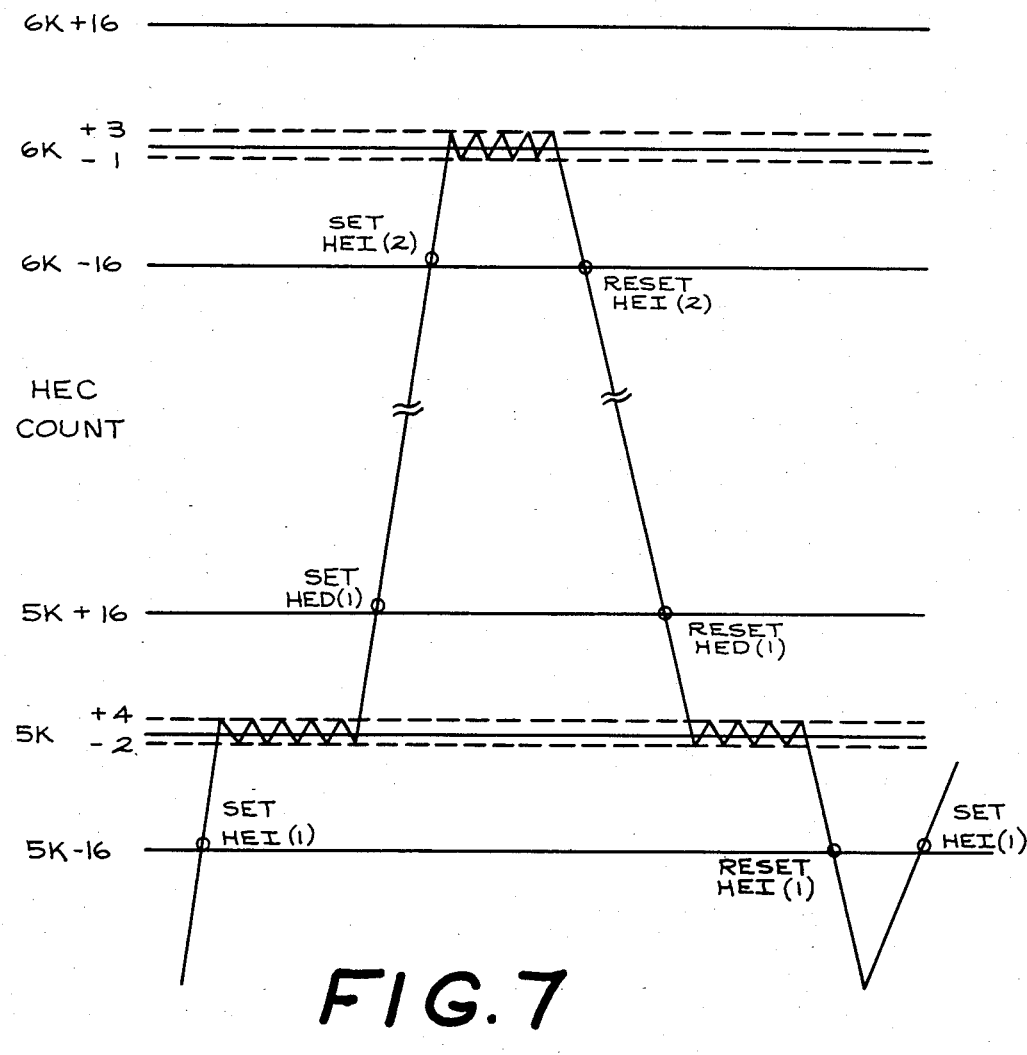
FIG. 7 is a graph depicting the count of the heater energy counter of the control arrangement of FIG. 2 demonstrating how the counter is incremented and decremented in response to a change in power setting from a lower setting to a higher setting and back to a lower setting.

This is illustrated in FIG. 7 for maximum counts 5120 and 6144 corresponding to power settings 5-7 and 8-10 respectively. When one of power settings 5-7 is initially selected the Heater Energy Counter is incremented in increments of 6 until it reaches a steady state value between 5118 and 5122. HEI(1) is set at count 5104. If the power setting is changed to one of settings 8-10, the Heater Energy Counter is incremented at the rate of +3 each control cycle. When HEC reaches 5136, HED(1) is set for later use. When the count exceeds 6128, HEI(2) is set indicating the steady state value for power settings 8-10 has been reached. The count of the counter now remains between 6147 and 6143. If the power setting is again changed to one of power settings 5-7, the counter is decremented at the rate of 2 counts each control interval. When the count reaches 6128 HEI(2) is reset. When the count reaches 5136 HED(1) is reset indicating that the steady state level has been reached for power settings 5-7.

Temp Display Control means 104 checks the state of the latch associated with the power setting represented by the digital power signal stored in MemorY 58. When the associated HEI latch is first set or the HED latch is first reset, the Temp Display Control means 104 sets the HDPL latch 106, which enables the display means 108. HDPL Timer 110 controls the time period for enabling the display to provide the steady state temperature display. This time period begins when HDPL is set. When the time period times out, HDPL 106 is reset, disabling the steady state temperature display.

Figure 8:
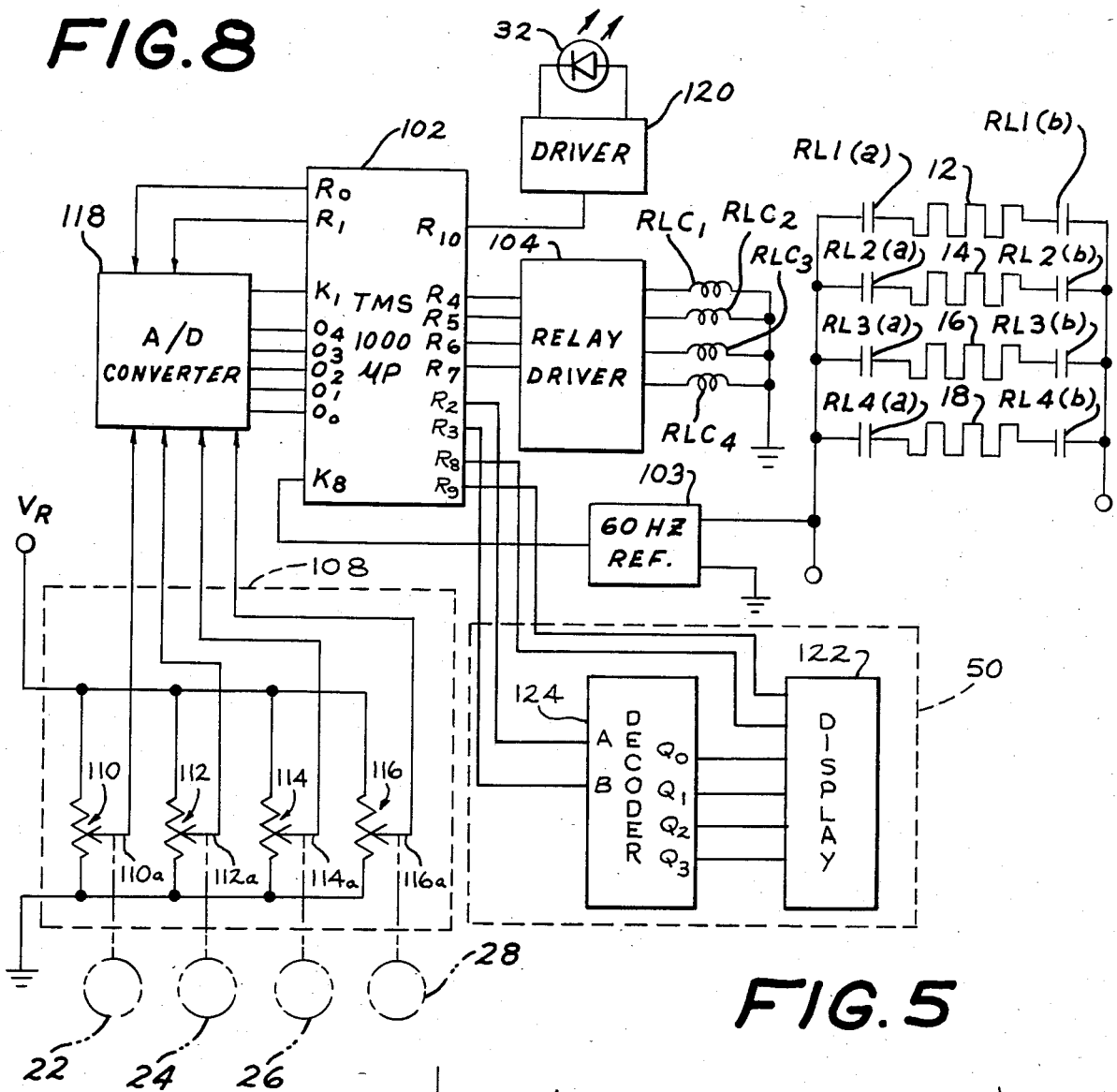
FIG. 8 is a simplified schematic diagram of a control circuit illustratively embodying a control arrangement incorporating the temperature monitoring arrangement of the present invention.

Referring now to FIG. 8, there is shown in simplified schematic form a microprocessor based control circuit which illustratively embodies the temperature monitoring arrangement of the present invention incorporated within a more comprehensive control system. Power to heating elements 12, 14, 16 and 18 is provided by application of a standard 60 Hz AC power signal of either 120 or 240 volts across terminals L1 and L2. Heating elements 12, 14, 16 and 18 are arranged in an electrical parallel fashion across lines L1 and L2 via an array of relays RL1, RL2, RL3 and RL4, each having two sets of contacts (a) and (b) connected between the heating element and lines L1 and L2, respectively, for elements 12, 14, 16 and 18, respectively.

Control signals for opening and closing relays RL1–RL4 are provided by microprocessor 102. A 60 Hz signal is generated by a conventional zero crossing detector 103 and applied to microprocessor input port K8 for purposes of synchronizing system operation with zero crossings of the power signal applied across terminals L1 and L2. Relay control signals from output ports R4–R7 are coupled to relay coils RLC1 through RLC4 of relays RL1–RL4, respectively, by relay driver network 104. These control signals are generated by microprocessor 102 in accordance with the power level selected by the user in a manner to be described hereinafter.

Means for enabling the operator to select the desired power level for each of the heating elements 12, 14, 16 and 18 is provided by power level selection means designated generally 108. Power level selection switch means 108 comprises a set of four potentiometers 110–116 connected in parallel, for controlling of heating element 12, 14, 16 and 18, respectively. A constant reference voltage is applied across the potentiometers 110–116. Wiper arms 110(a), 112(a), 114(a) and 116(a) for potentiometers 110–116, respectively, are positioned in accordance with the power settings selected by operator manipulation of control knobs 22–28 respectively. Conventional analog to digital converter means 118 scans the setting from each of potentiometers 110–116 to provide a digital input signal to microprocessor 102 representing the power level selected for each heating element. Scanning signals are output from microprocessor 102 at output ports $0_0$ through $0_4$. The power level signal is input to microprocessor 102 at input port K1. Signal light 32 comprises a conventional light-emitting diode (LED) which is coupled to output port $R_{10}$ of microprocessor 102 by a conventional LED driver circuit 120.

Outputs R2, R3, R8 and R9 of microprocessor 102 are used to control display means 50 which comprises the display arrays 26–29 (FIG. 1) represented functionally as Block 122 and decoder 124. Outputs R2 and R3 are connected to inputs A and B of decode circuit 124, a conventional 3×8 decoder integrated circuit of the type readily commercially available identified by the part number DC4028. Decoder circuit 124 sequentially enables the display for each surface unit. Outputs R2 and R3 of microprocessor 102 sequence decoder 124 through its first four states to sequentially generate enable signals at outputs Q0–Q3 for enabling the display arrays for surface units 12–18 respectively as described hereinafter with reference to FIG. 9.

Figure 9:
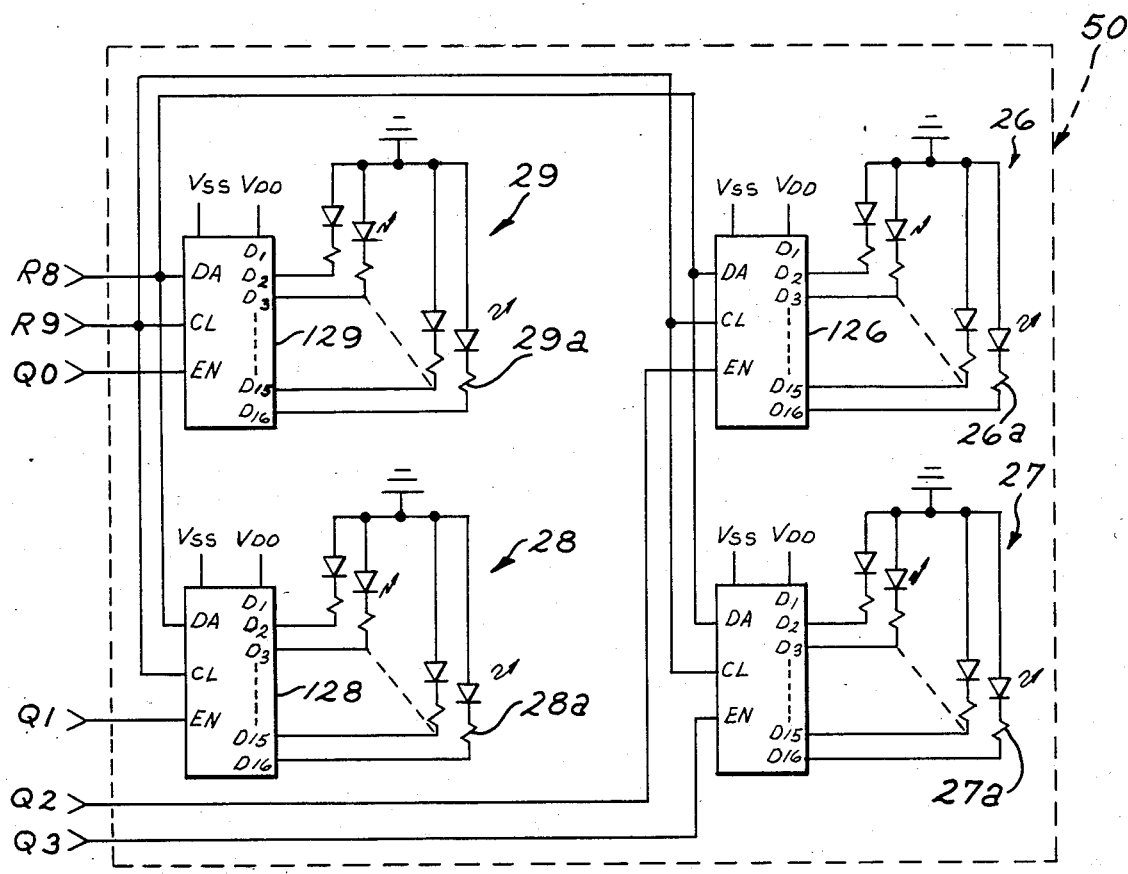
FIG. 9 is a schematic diagram showing a portion of the circuit of FIG. 8 in greater detail.

Referring now to FIG. 9 which illustrates display means 50 of FIG. 8 in greater detail, as hereinbefore described with references to FIGS. 1 and 2, each of surface unit displays 26–29 comprises a linear array of 15 LEDs. Arrays 26–29 are controlled by display driver integrated circuits 126–129 respectively of the type available commercially from National Semiconductor identified by the part number MM5484. Each of driver outputs D2–D16 are connected to an associated LED via a current limiting resistor designated 26a–29a for arrays 26–29 respectively. Outputs Q0–Q3 of decoder 124 are connected to enable inputs (EN) for drivers 126–129 respectively. Output ports R8 and R9 of microprocessor 112 are connected to the Clock (CL) and DATA IN (DA) inputs respectively of each of drivers 126–129.

As will be hereinafter described, to signify to the user that the surface unit has reached its steady state temperature, the display is blinked on and off at a visually discernible 1 Hz rate for a period of 15 seconds when the heater energy counter reaches the steady state count for the selected power level.

Microprocessor 102 of the circuit of FIG. 7 is a TMS 1100 series microprocessor. Technical details concerning the general characteristics of microprocessor 102 are available in a Texas Instruments, Inc. publication entitled, "TMS 1000 Series Data Manual", published in December 1975.

Microprocessor 102 is customized to perform the control functions of this invention by permanently configuring the ROM of the microprocessor to implement predetermined control instructions. FIGS. 10–19 and 21 are flow diagrams which illustrate the control routines incorporated in the control program of microprocessor 102 to perform the control functions in accordance with the present invention. From these diagrams, one of ordinary skill in the programming art can prepare a set of instructions for permanent storage in the ROM of microprocessor 102. For the sake of simplicity and brevity, the control routines to follow will be described with respect to the control of heating element 12. It should be understood that for the control system of FIG. 1 the routines are executed once for each of heating elements 12-18 during each control interval. It should be further understood that in addition to the control functions described herein there may be other control functions to be performed in conjunction with other operating characteristics of the appliance such as, for example, implementing the transient Instant On, Fast-Heat and Fast-Cool Modes described in U.S. Pat. No. 4,443,690. Instructions for carrying out the routines described in the diagrams may be interleaved with instructions and routines for other control functions which are not part of the present invention.

The control program consists of a sequence of routines illustrated in the flow diagrams. The control program is cycled through once each control interval for each heating element. It should be noted that the control circuit is continually energized while the apparatus is plugged in regardless of the power setting selected. A description of each routine with reference to the flow diagram follows.

Figure 10:
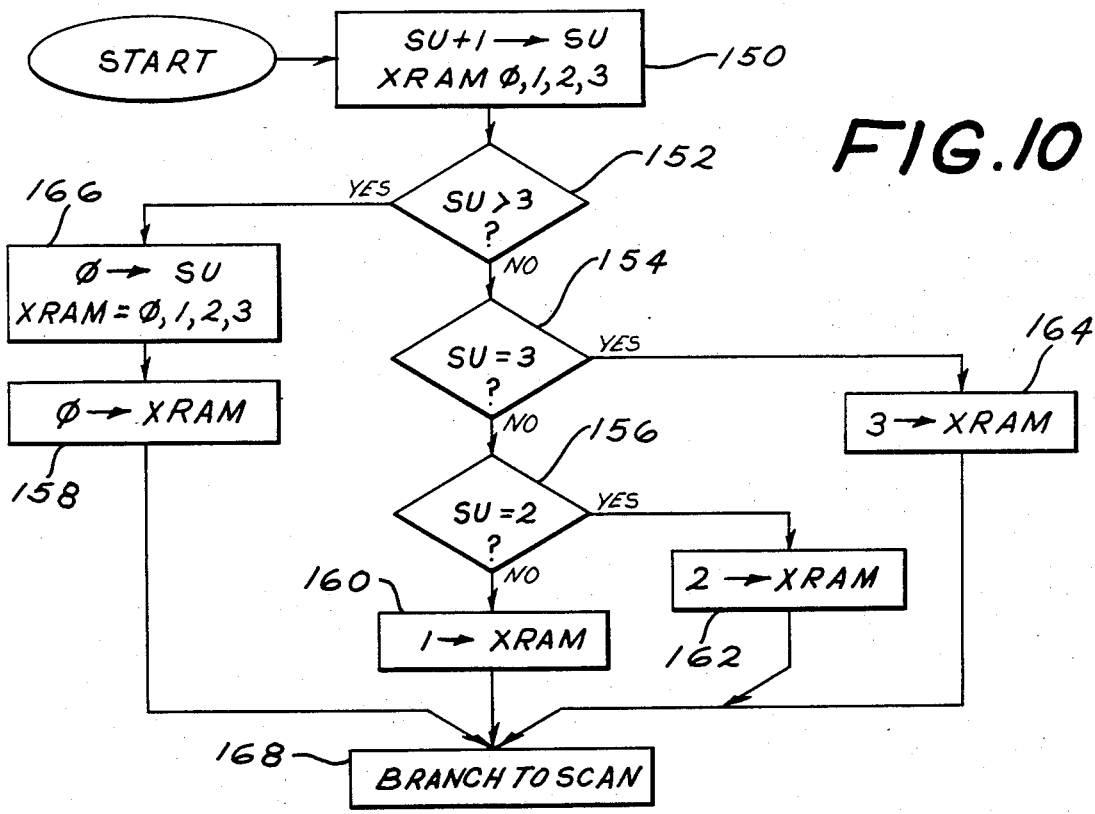
FIG. 10 is a flow diagram of the START routine incorporated in the control program for the microprocessor in the circuit of FIG. 8.

START Routine (FIG. 10)

The control program includes a separate RAM file for each surface unit. The function of this routine is to call up the appropriate RAM file to be used, that is, the file associated with the surface unit for which the control program is currently being executed. A counter designated the SU Counter is provided in each RAM file and used to call up the four RAM files sequentially such that each RAM file is called up every four passes through the Control Program.

Referring to FIG. 10, Block 150 increments the SU Counter in all four RAM files designated by variable XRAM with XRAM=0-3 identifying the RAM files for surface units 12-18 respectively.

Figure 11:
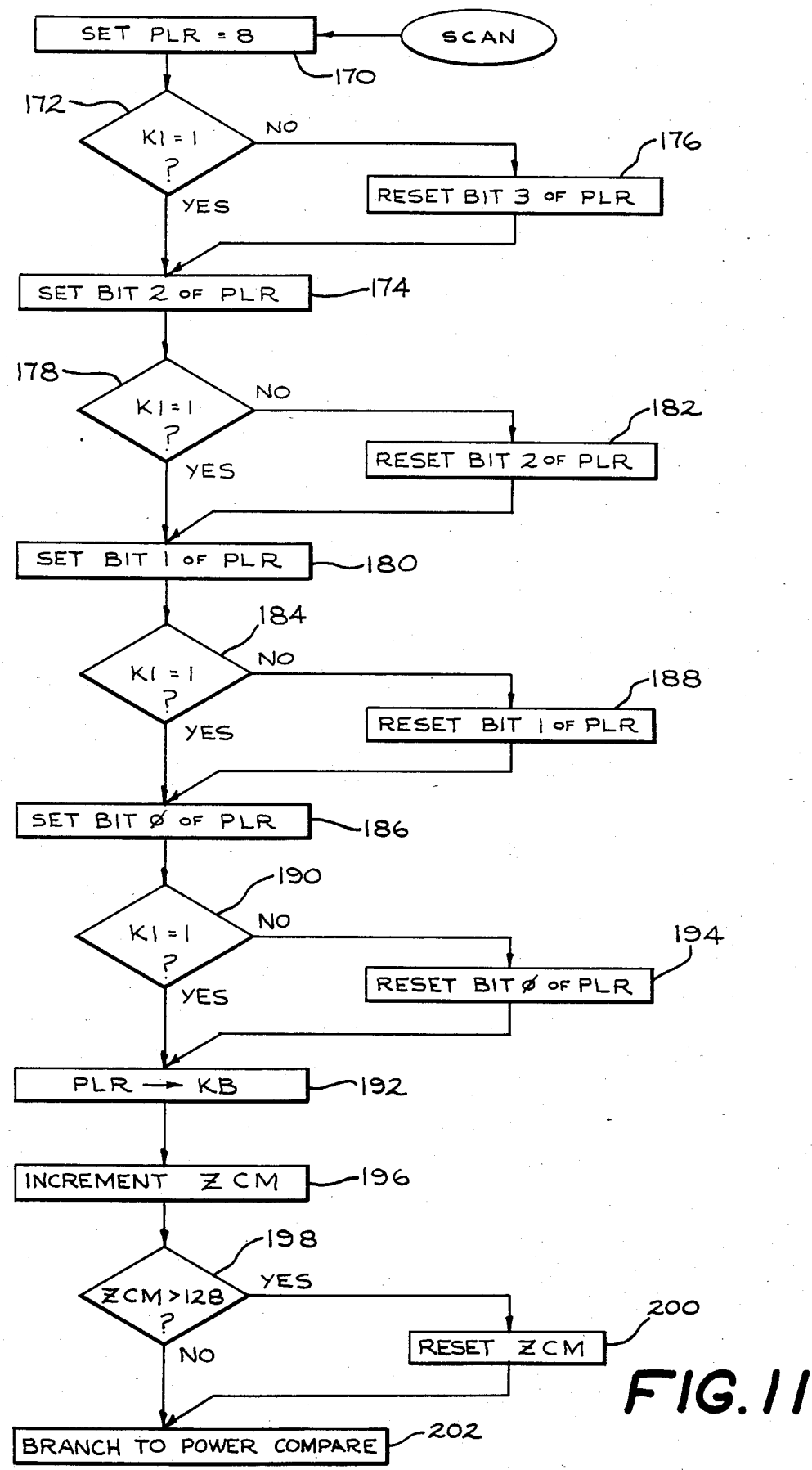
FIG. 11 is a flow diagram of the SCAN routine incorporated in the control program for the microprocessor in the circuit of FIG. 8.

Inquiries 52, 154 and 156 determine the SU Count and call up the appropriate one of RAM files 0, 1, 2, 3 via Blocks 158, 160, 162 and 164 for SU equal to 1, 2, 3 and 4 respectively. For SU equal to 4, the SU Counter in all four RAM files is reset to zero (Block 166). Having selected the appropriate RAM file, he program then branches (Block 168) to the Scan Routine (FIG. 11).

SCAN Routine (FIG. 8)

The function of this routine is to scan the operator controlled input potentiometers to determine the power setting selected for each of the heating elements. During execution of this routine for a particular heating element, the potentiometer associated with that heating element is scanned.

It will be recalled that there are 16 possible power settings represented by digital signals corresponding to the number of settings from 0-15. In this routine, PLR is a 4-bit digital word which sets the reference voltage in the A/D conversion scheme via a resistive ladder network portion of A/D converter 118. PLR is varied in accordance with a successive approximation technique and the voltage generated in the A/D converter is then compared to the voltage across the corresponding one of operator adjustable potentiometers 110-116 to determine the power level selected.

The search starts in the middle with PLR equal to eight (PLR-1000) (Block 170). Inquiry 172 determines if the operator selected power setting is higher ($K1=1$) or lower ($K1=0$). If higher, PLR is set equal to 12 by setting Bit 2 (PLR-1010) (Block 134). If lower, PLR is set equal to 4 by resetting Bit 3 (Block 176) and setting Bit 2 (Block 174) (PLR- 0010).

Inquiry 178 determines if the setting is higher or lower than the present PLR. If higher ($K1=1$) the PLR is increased by 2 by setting Bit 1 (Block 180). If lower ($K1=0$) PLR is decreased by 2 by resetting Bit 2 (Block 182) and setting Bit 1 (Block 180).

Inquiry 184 determines whether the present value of PLR is higher or lower than the reference. If higher, PLR is increased by 1 by setting Bit 0 (Block 186). If lower, PLR is decreased by 1 by resetting Bit 1 (Block 188).

Inquiry 190 repeats the higher or lower test on the selected value. If higher, PLR is read into KB (Block 192). If lower, PLR is reduced by 1, by resetting Bit 0 (Block 194) and then PLR is read into KB (Block 192).

The Master Counter (ZCM) is incremented (Block 196). The ZCM count is checked by inquiry 198. If greater than 128, ZCM is reset (Block 200). The program then branches (Block 202) to the Power Compare Routine, FIG. 12.

Figure 12:
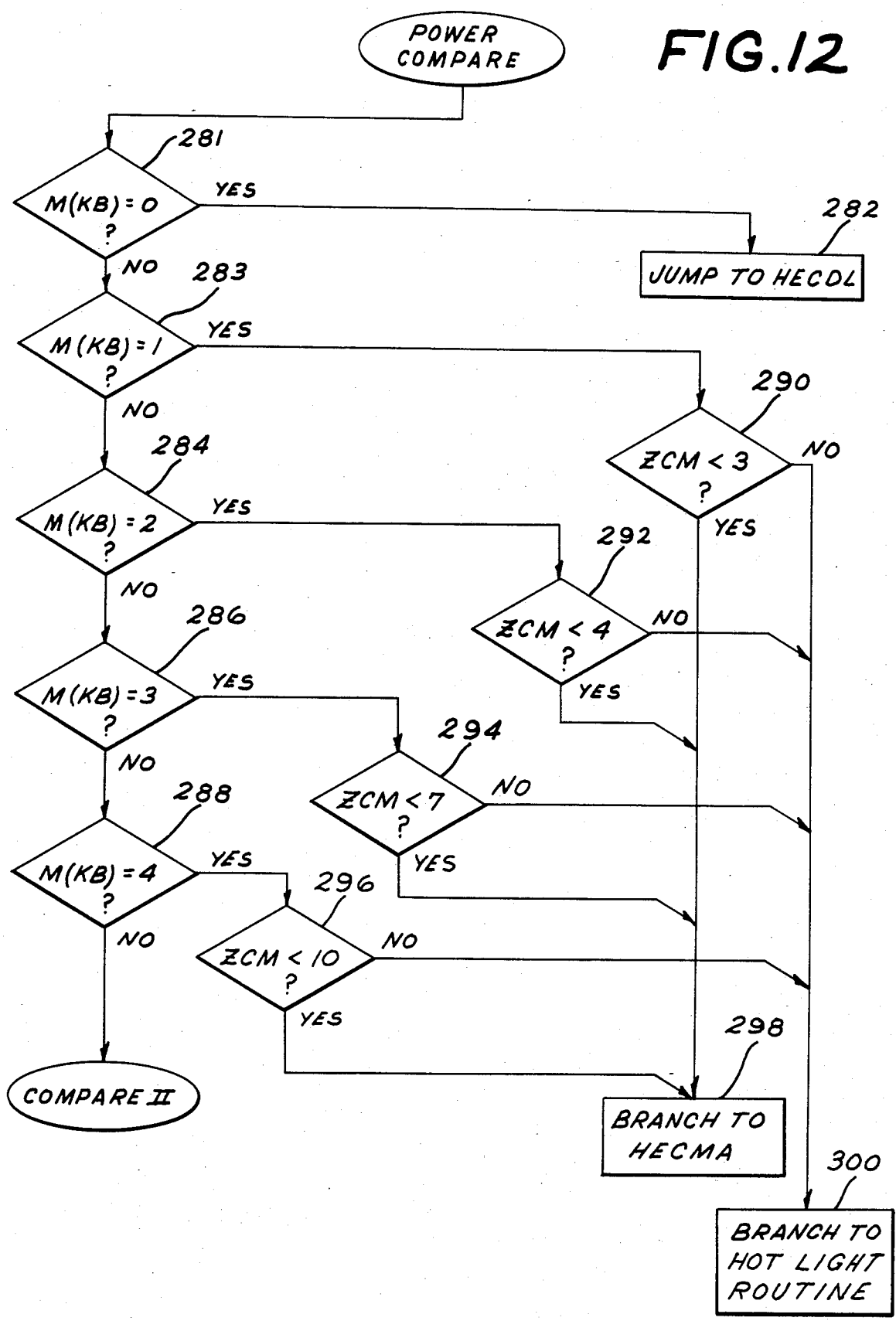
FIGS. 12-14 are flow diagrams of the POWER COMPARE routine incorporated in the control program for the microprocessor in the circuit of FIG. 8.
Figure 13:
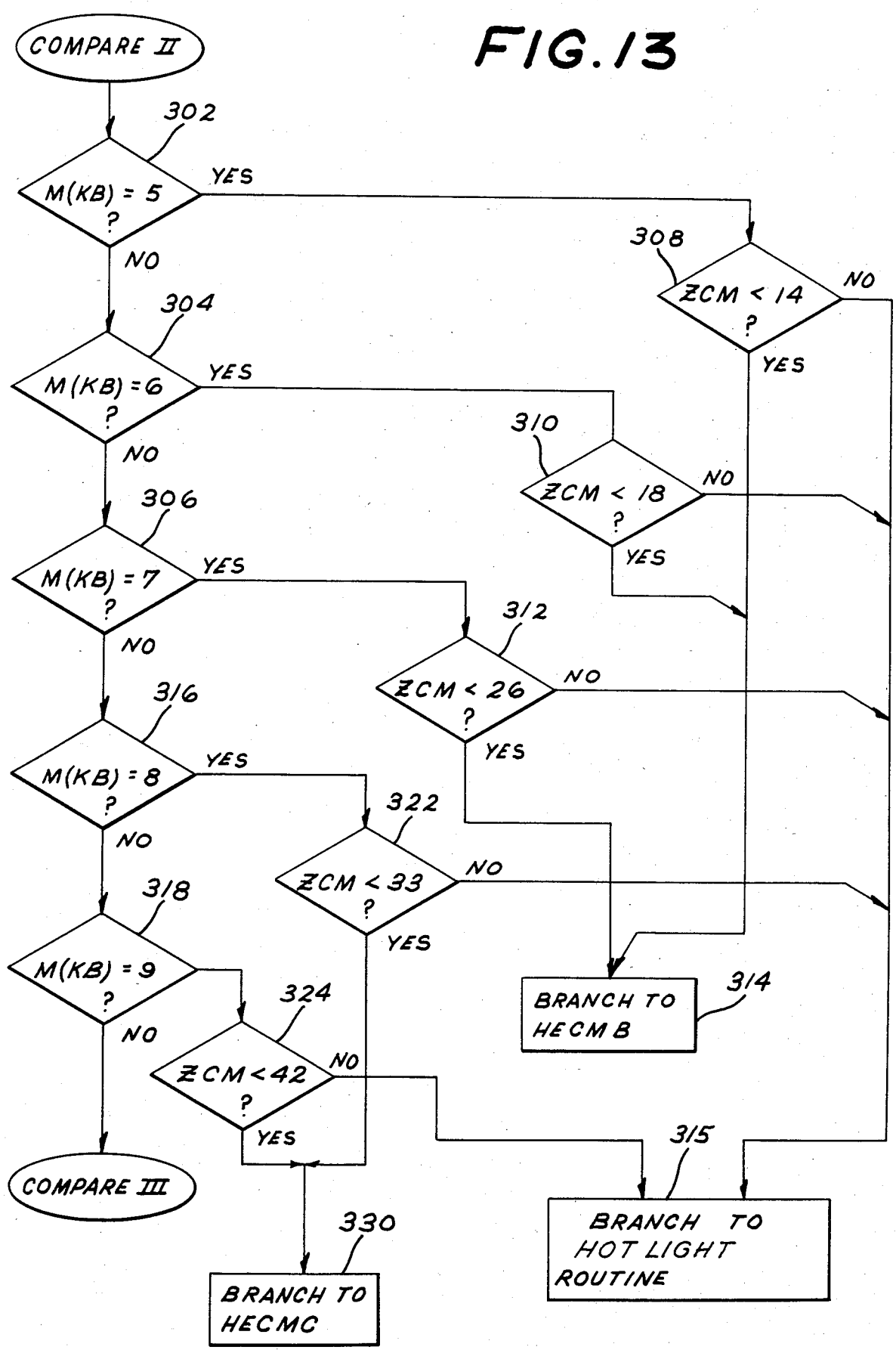
Figure 14:
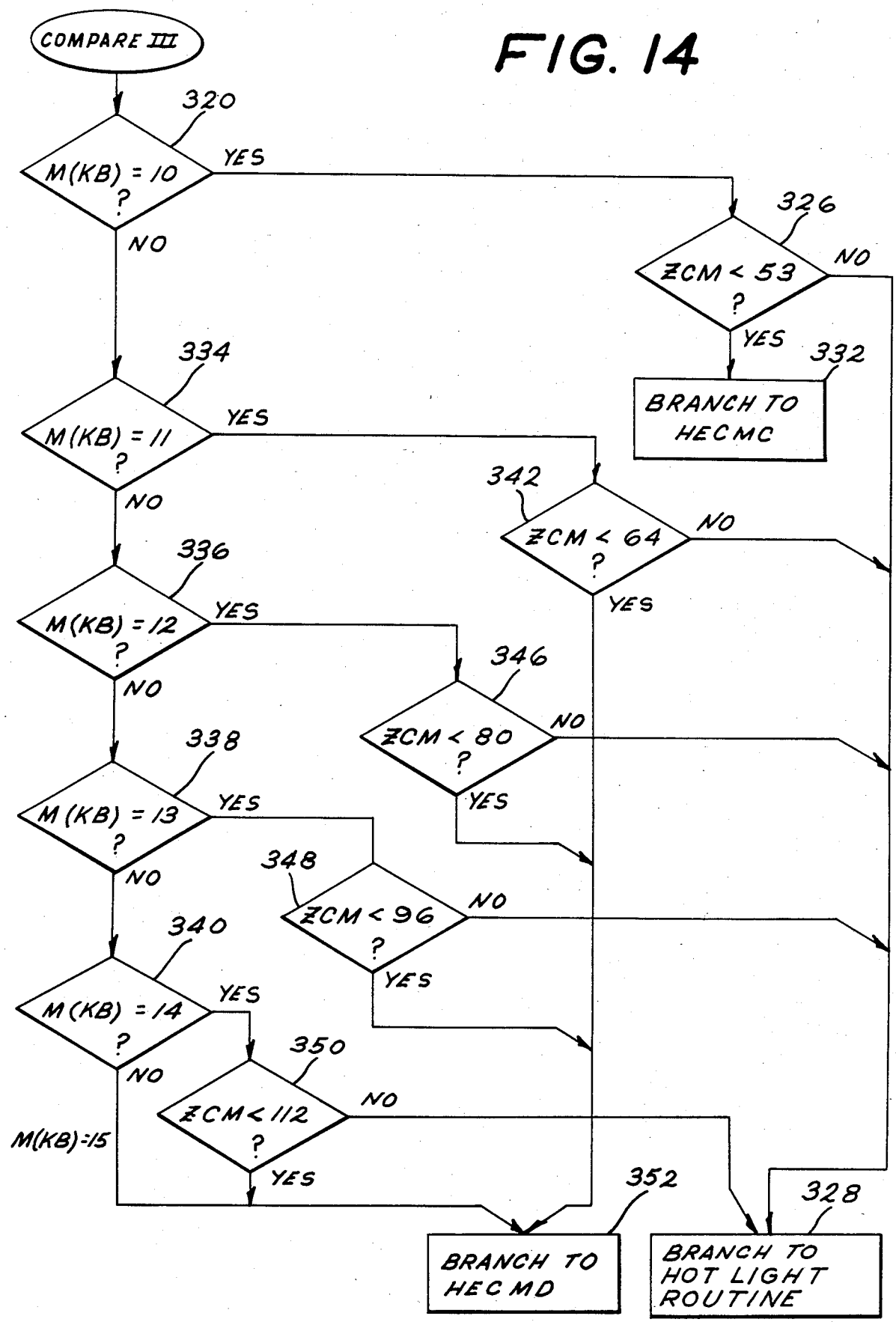

POWER COMPARE Routine (FIGS. 12-14)

Figure 17:
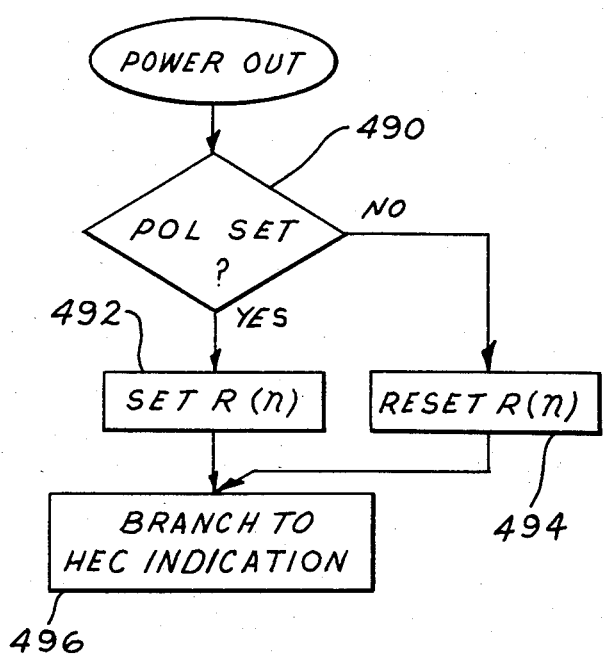
FIG. 17 is a flow diagram of the POWER OUT routine incorporated in the control program for the microprocessor in the circuit of FIG. 8.

This routine performs the primary function of Compare Means 82 of FIG. 6, namely, to determine during each control interval whether or not the heating element is to be energized for the ensuing control interval. This is done by comparing the count of the Master Counter (ZCM) to a number corresponding to the number of control intervals for which the heating element is energized per control period for the power setting selected. For M(KB)=0 representing the OFF power setting, Inquiry 281 directs the program to the Counter Decrementing Routine HECDL (Block 282). For M(KB) representing power level settings of 1-4, (Inquiries 283-288), the ZCM count is compared to reference counts 3, 4, 7 and 10, respectively (Inquiries 290-296). If the power level selected is one of levels 1-4 and the ZCM count is less than the reference corresponding to that power level, the heating element will be energized during the ensuing control interval and the program branches (Block 298) to the Heater Energy Counter Routine, entry point HECMA (FIG. 15A), to appropriately increment the Energy Counter. If the ZCM count is not less than the corresponding reference value of the selected power level, the program branches (Block 300) to the Hot Light Routine (FIG. 17). If the selected power level is not one of levels 1-4, the program continues to COMPARE II (FIG. 13). Inquiries 302, 304 and 306 determine whether the selected power level is level 5, 6, or 7, respectively. The corresponding reference values for these power levels are 14, 18 and 26, respectively. If the selected power level is one of 5, 6, or 7 and the ZCM count is less than the corresponding reference value as determined by Inquires 308-312, respectively, the heating element will be energized during the ensuing control interval, and the program branches (Block 314) to the Heater Energy Compare Routine, entry point HECMB (FIG. 15A) to appropriately increment the Heater Energy Counter. If one of these power levels is selected but the count is greater than the corresponding reference value, the heating element will not be energized during the ensuing control interval and the program branches (Block 315) to the Hot Light Routine (FIG. 17).

Figure 15A:
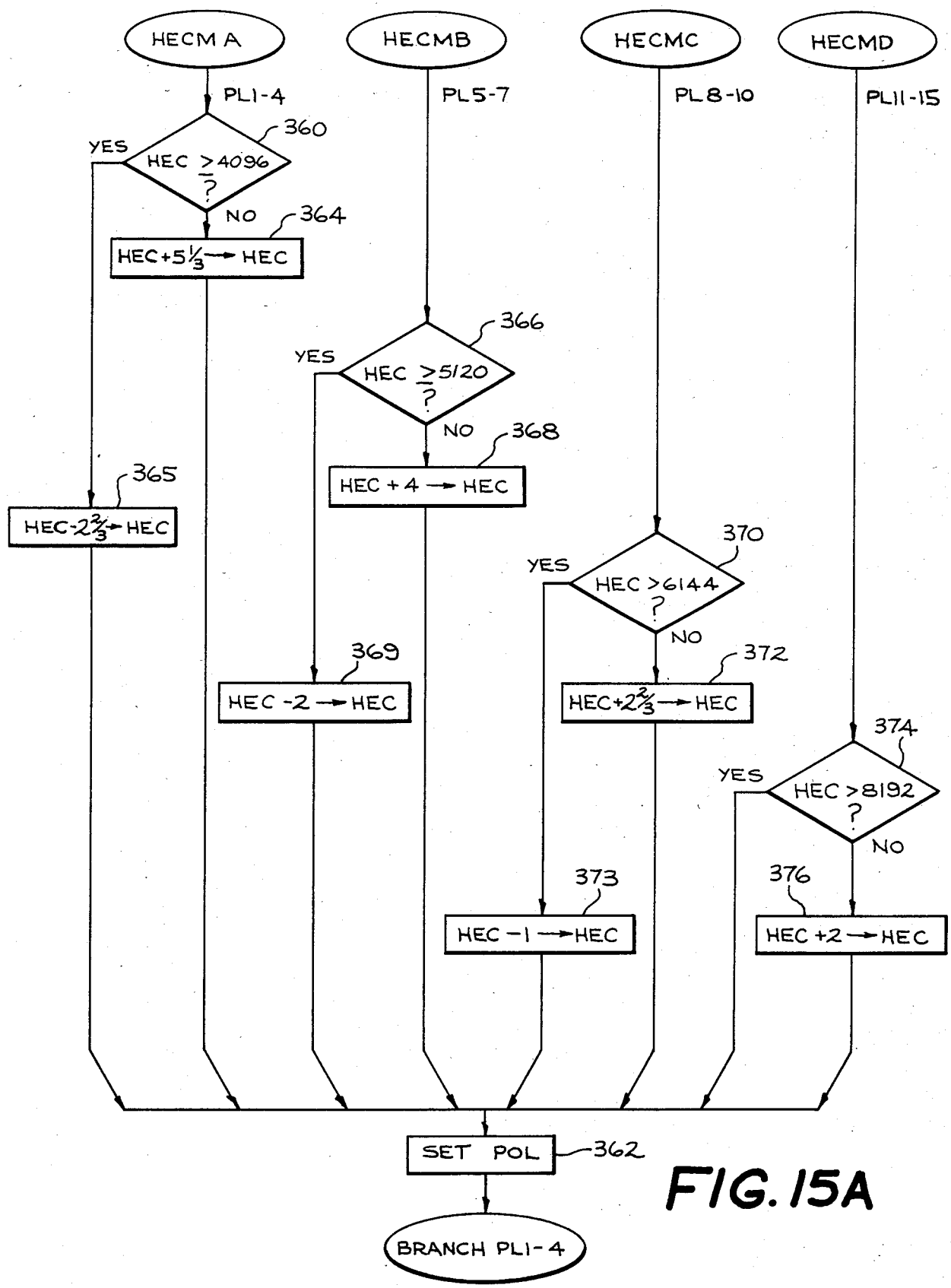

Inquiries 316, 318, (FIG. 13) and 320 (FIG. 14) determine whether power levels 8, 9 and 10 have been selected, respectively. The reference values associated with these power levels are 33, 42 and 52, respectively. If the ZCM count is less than the reference value corresponding to the selected power level, as determined by Inquiries 322, 324 (FIG. 13) and 326 (FIG. 14) the heating element will be energized during the ensuing control interval, and the program branches (Block 330) (FIG. 13) for Inquiries 322 and 324. Block 332 for Inquiry 326 (FIG. 14) to the Heater Energy Compare Routine at entry point HECMC (FIG. 15A) to increment the Heater Energy Counter at the appropriate rate. If one of these levels is selected but the ZCM count is greater than the reference value, the program branches (Block 315) for Inquiries 322 and 324 (FIG. 13) and Block 328 for Inquiry 326 (FIG. 14) to the Hot Light Routine (FIG. 17). Finally, Inquiries 334, 336, 338 and 340 determine whether power level 11, 12, 13, or 14 has been selected, respectively; corresponding reference values are 64, 80, 96, and 112, respectively. If the ZCM count is less than the corresponding reference value as determined by Inquiries 342-350 for one of the selected power levels, the heating element will be energized during the ensuing control interval, and the program branches (Block 352) to the Heater Energy Compare Routine at entry point HECMD (FIG. 15A) to increment the Heater Energy Counter. If the answer to Inquiry 340 is no, the selection must represent power level 15, which is the maximum power level for which the heating element is energized for every control interval, and the program branches (Block 352) to Heater Energy Compare Routine at entry point HECMD (FIG. 15A). If one of levels 1-14 is selected and the ZCM count is greater than or equal to the reference value, the program branches (Block 328) to the Hot Light Routine (FIG. 17).

HEATER ENERGY COMPARE Routine (FIGS. 15A-15F)

The Heater Energy Compare Routine performs the function of Counter Control Means 48 of FIGS. 2 and 6 by incrementing the Heater Energy Counter at the rate associated with the power level at which the heating element is operating when the count is less than the maximum count for that selected level, discontinuing the incrementing of the Heater Energy Counter when the maximum count for the selected level is reached and decrementing the Heater Energy Counter when a change in power setting from a relatively high setting to a relatively low setting occurs, if the count of the Heater Energy Counter is greater than the maximum count associated with the selected power level, and at a rate which approximates the rate of temperature decrease when the heating element cools down to the steady state temperature associated with the selected lower power setting from the operating temperature associated with the previously selected relatively higher power setting.

For non-OFF power settings the Heater Energy Counter is only incremented during control intervals immediately preceding those control intervals during which the heating element is to be energized. This same technique is employed for decrementing the Heater Energy Counter for non-OFF power settings. When the heating element is to be energized during the next control interval as determined by the Power Control Routine hereinbefore described (FIGS. 12-14), the Heater Energy Compare Routine of FIG. 15A is entered at one of points HECMA-HECMD, depending upon the selected power level. When entered at one of these points, the Heater Energy Counter is either incremented or decremented the appropriate number of counts and the Power Out Latch (POL) is set. When the POL is set, a signal will be generated at R4 at the beginning of the next control interval for element 12 to hold contacts RL1(a) and RL1(b) closed for the duration of that control interval.

If one of power levels 1-4 has been selected, this routine is entered at entry point HECMA. Inquiry 360 determines whether the Heater Energy Counter has reached the maximum count for these four settings of 4096. If the count is less than this maximum count this indicates that the heating element is still heating up, and the Heater Energy Counter is effectively incremented $5\frac{1}{3}$ counts (Block 364) and the Power On Latch (POL) is set (Block 362). This increments the HEC at average rates of 16, $21\frac{1}{3}$, $37\frac{1}{3}$, and $53\frac{1}{3}$ counts per control period for power settings 1-4, respectively. Setting of POL (Block 362) will close the heater control relay for the next control interval.

If the maximum count for settings 1-4 has been exceeded, this signifies that the heating element had been previously operating at a power setting higher than power setting 4, with a corresponding higher temperature, and that the Heater Energy Counter has not yet been decremented to the lower maximum count associated with power settings 1-4, which in turn signifies that the heating element is in the cool-down phase between its previous higher temperature and the lower temperature associated with the lower power setting. The Heater Energy Counter is thus effectively decremented by $2\frac{2}{3}$ counts (Block 365), and the Power Out Latch is set (Block 362). This decrements the HEC at effective average rates of 8, $10\frac{2}{3}$, $18\frac{2}{3}$, and $26\frac{2}{3}$ counts per control period for power settings 1-4, respectively.

If the heating element is presently being operated at one of levels 5-7, this routine is entered at HECMB. Inquiry 366 determines if the maximum count associated with these levels of 5120 has been reached. If not, HEC is incremented by 4 counts (Block 368) and POL is set (Block1 362). This increments the HEC at the rate of 56, 72 and 104 counts per control period for settings 5, 6 and 7, respectively. If the HEC count exceeds the maximum count, again indicating heating element operation in the cool-down phase following a change from a higher power setting, the HEC is decremented by 2 counts (Block 369) and the POL is set (Block 362). This decrements the HEC at an effective average rate of 28, 36, and 52 counts per control period for settings 5, 6 and 7, respectively.

If the heating element is operating at one of levels 8-10, this routine is entered at point HECMC. Inquiry 370 determines if the maximum count associated with these levels of 6144 has been reached. If not, the HEC is effectively incremented by $2\frac{2}{3}$ counts (Block 372) and the POL is set (Block 362). This increments the HEC at an effective average rate of 88, 112, and $141\frac{1}{3}$ counts per control period for levels 8, 9 and 10, respectively. If the HEC count exceeds the maximum count, signifying operation in the cool-down phase following a change from a higher power setting, the HEC is decremented by 1 count (Block 373) and the POL is set (Block 362). This decrements the HEC at an effective rate of 33, 42 and 53 counts per control period for power settings 8, 9 and 10, respectively.

If the heating element is being operated at one of power levels 11-15, this routine is entered at entry point HECMD. Inquiry 374 determines whether the maximum count for these power levels of 8192 has been reached. If not, the HEC is incremented by 2 (Block 376) and the POL is set (Block 362). This increments the HEC at an effective rate of 128, 160, 192, 224 and 256 counts per control period for levels 11, 12, 13, 14 and 15, respectively. Since there are no conditions under which selection of one of these power levels requires decrementing of the HEC, if the maximum count has been reached, Block 376 is bypassed, leaving the count of the HEC unchanged and POL is set Block 362).

Figure 15B:
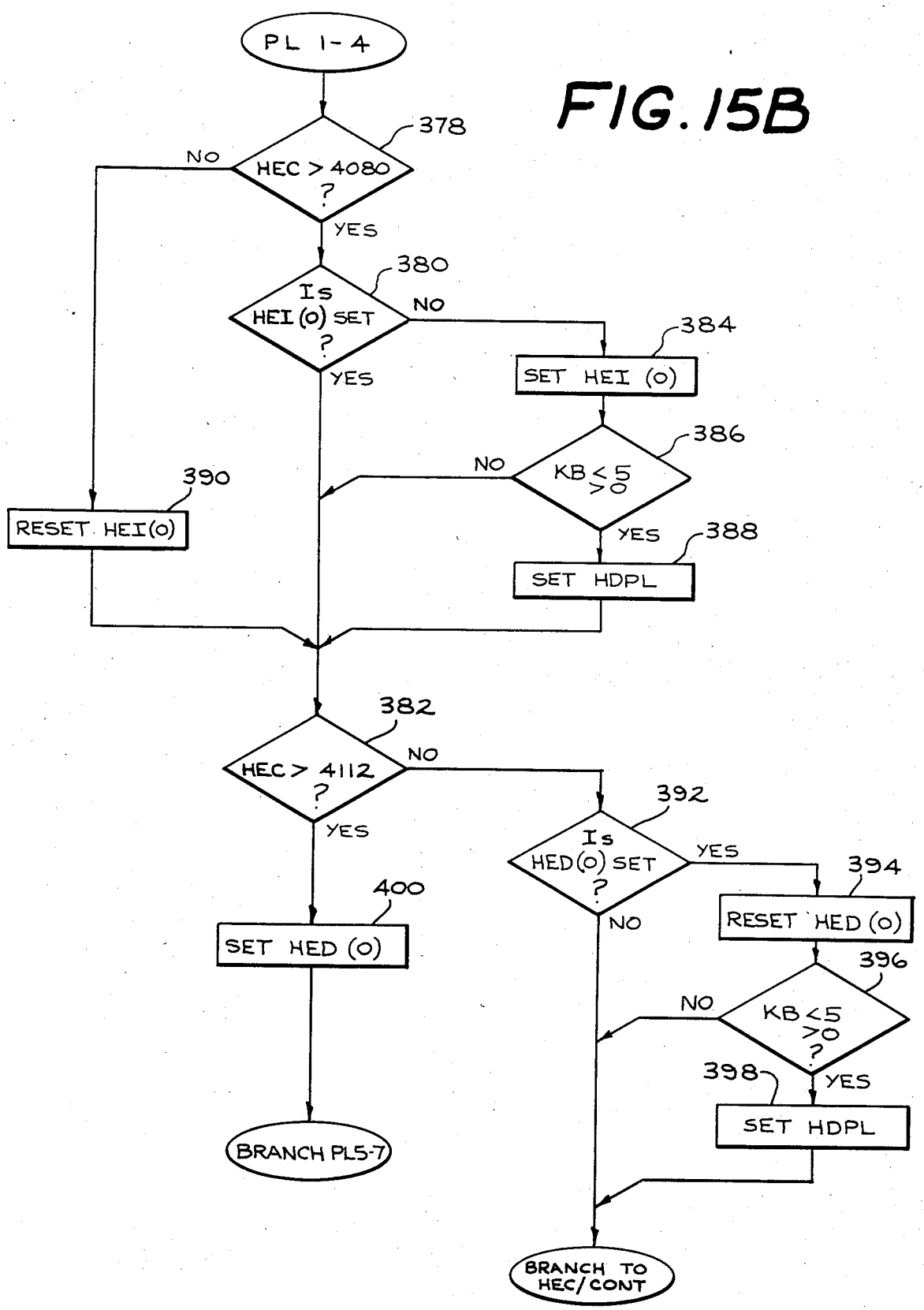

Having incremented or decremented the Heater Energy Counter, this routine next performs the function of counter compare means 86 (FIG. 6) relating to the temperature display function, namely, the setting and resetting of the HEI(0)-HEI(3) and HED(0)-HED(3) latches. Referring now to FIG. 15B, Inquiry 378 compares the heater energy counter count (HEC) to the incrementing threshold reference level set at 4080 which is 16 counts less than the maximum count of 4096 (Table I) for power settings 1-4. If HEC is greater than this threshold, Inquiry 380 checks the present state of latch HEI(0). If set, signifying that the threshold was exceeded during a preview pass through the routine, the program proceeds to Inquiry 382. If not already set, HEI(0) is set (Block 384); and Inquiry 386 determines if KB represents one of power settings 1-4. If yes, HDPL is set (Block 388)., otherwise the program proceeds to Inquiry 382. Referring briefly back to Inquiry 378, if the count is not greater than the incrementing threshold level for settings 1-4, then HEI(0) is reset (Block 390) and the program proceeds to Inquiry 382.

Inquiry 382 compares the heater energy count to the decremental threshold for heat settings 1-4, which is set at 4112, which is 16 counts above the maximum count of 4096 for settings 1-4. If the count is less than this threshold, Inquiry 392 checks the state of HED(0). If set, signifying that the counter is being decremented, HED(0) is reset (Block 394) to signify having reached the steady state level from a higher level; and Inquiry 396 determines if KB represents one of power settings 1-4. If yes, then the steady state level for the selected power setting has been reached and HDPL is set (Block 398) and the program continues (Block 400) to HEC/CONT (FIG. 15F). If KB is not one of settings 1-4 or if HED(0) was not set (No at Inquiry 392), the program continues to HEC/CONT (FIG. 15F) without setting HDPL.

Returning to Inquiry 382, if the HEC count is greater than the decrementing threshold, HED(0) is set (Block 400) and the program continues to entry point PL 5-7 (FIG. 15C) to execute similar steps for the latches HEI(1) and HED(1) associated with the power settings 5-7.

Figure 15C:
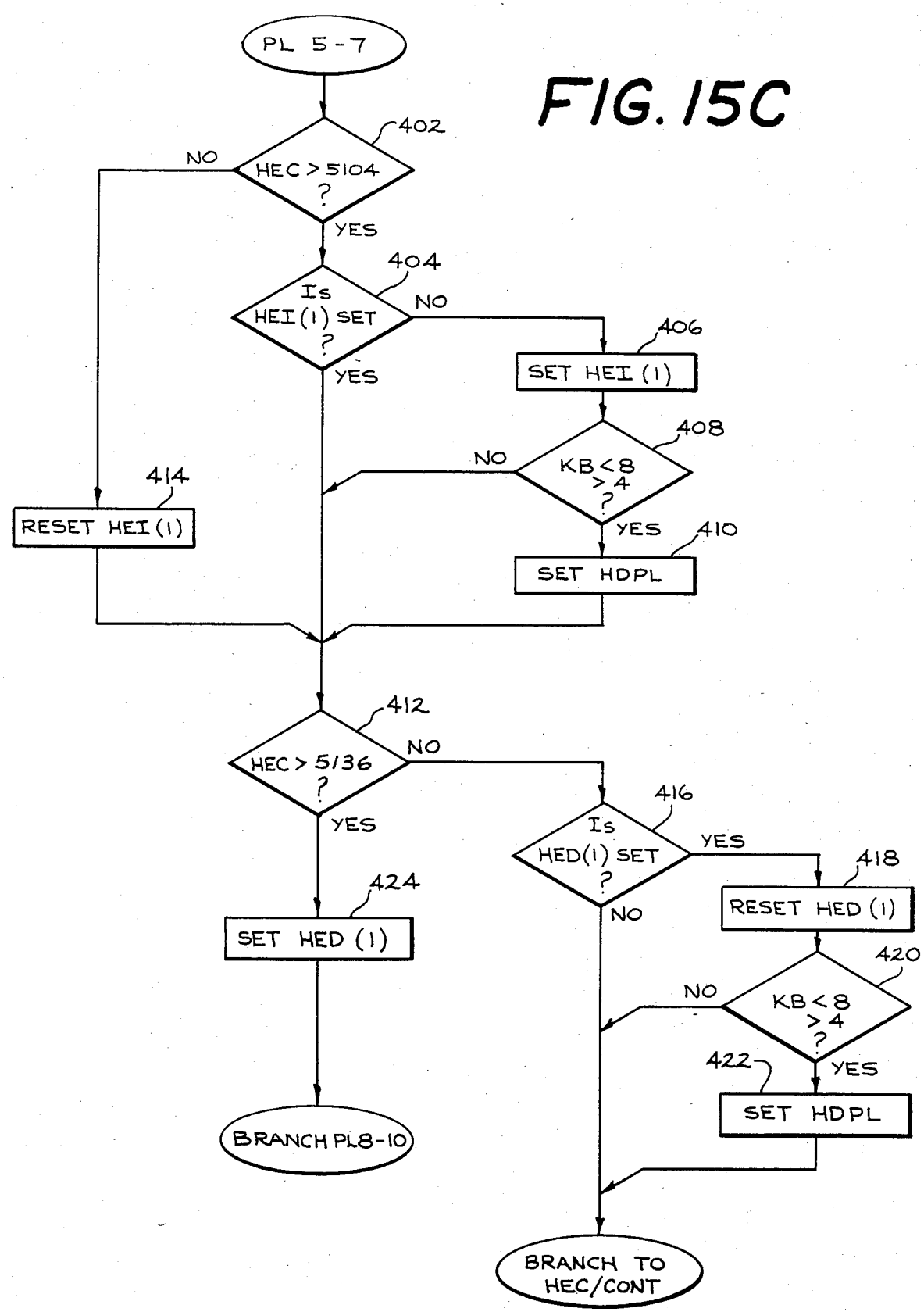

Referring now to FIG. 15C, Inquiry 402 compares the heater energy count (HEC) to the incrementing threshold for power settings 5-7 which is set at 5104, which is 16 counts less than 5120, the maximum count for settings 5-7. If greater, the state of HEI(1) is checked (Inquiry 404). If not set, HEI(1) is set (Block 406) and Inquiry 408 determines if KB is one of settings 5-7. If it is, HDPL is set (Block 410); otherwise the program continues to Inquiry 412. If HEI(1) is set (Inquiry 404), the program proceeds to Inquiry 412. Referring back to Inquiry 402, if the incrementing threshold has not been reached, HEI(1) is reset (Block 414) and the program proceeds to Inquiry 412.

Inquiry 412 compares HEC to the decremental threshold for levels 5-7 which is set at 5136, which is 16 counts greater than 5120, the maximum count for levels 5-7. If less, Inquiry 416 checks the state of HED(1). If HED(1) is set signifying that the HEC is being decremented, (HED(1) would only have been set if the count was previously greater than the decrementing threshold HED(1) is reset (Block 418) and Inquiry 420 determines if KB is one of settings 5-7. If yes, HDPL is set (Block 422) and the program branches to HEC/CONT (FIG. 15F). Otherwise or if Inquiry 416 determines HED(1) is not set, the program branches to HEC/CONT (FIG. 15F) without setting HDPL. Returning to Inquiry 412 if HEC is greater than the decrementing threshold, HED(1) is set (Block 424) and the program continues to entry point PL8-10 (FIG. 15D) to repeat the process for latches HEI(2) and HED(2).

Figure 15D:
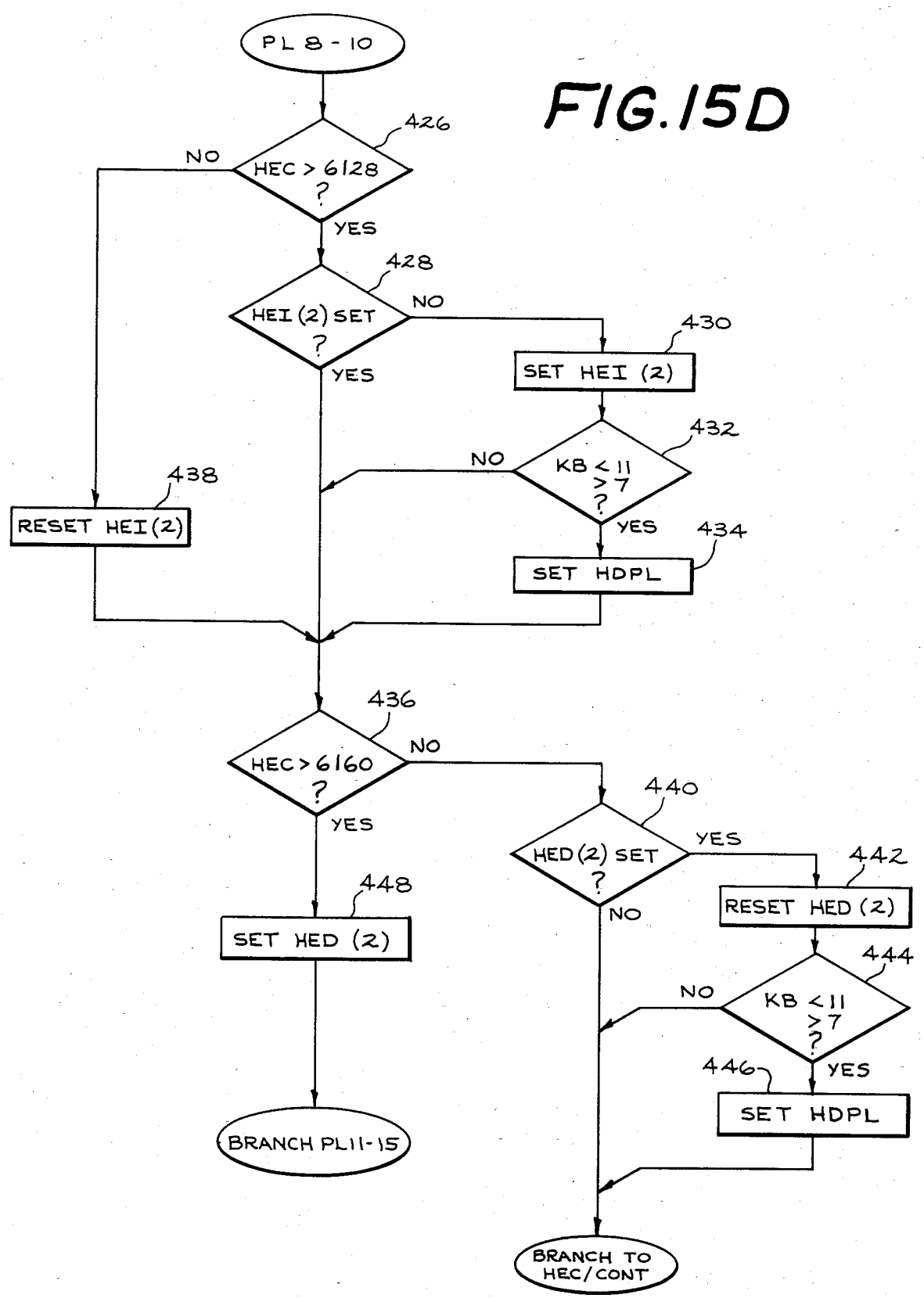

Referring to FIG. 15D, Inquiries 426, 428, 432, 436, 440 and 444 function analogously to Inquiries 402, 404, 408, 412, 416 and 418 respectively of FIG. 15C just described. Similarly, Blocks 430, 434, 438, 442, 446 and 448 perform analogously to Blocks 406, 410, 414, 418, 422 and 424 respectively of FIG. 15C just described. If KB is one of settings 8-10, the program branches to entry point HEC/CONT (FIG. 15F). Otherwise, the program proceeds to entry point PL11-15 (FIG. 15E).

Referring now to FIG. 15E, this portion of the routine executes similar steps for HEI(3). However, since the maximum count for heat settings 11-15 is never exceeded, there is no decrementing threshold and associated latch.

Inquiry 450 compares HEC to the maximum count 8192 for settings 11-15. If HEC is not less than 8192, Inquiry 452 checks the state of HEI(3). If not set, HEI(3) is set (Block 454) and HDPL is set (Block 456) and the program branches to HEC/CONT (FIG. 15F). If Inquiry 452 determines HEI(3) is set, the program branches to HEC/CONT without setting HDPL. Returning to Inquiry 450, if HEC is less than the maximum count, HEI(3) is reset (Block 458) and the program branches to entry point HEC/CONT.

Referring now to FIG. 15F, the portion of this routine entered at HEC/CONT controls a latch designated HELO associated with the hot light function. Inquiry 460 determines if HEC has exceeded the threshold count of 256 for energizing the hot light. The count of 256 corresponds to a temperature on the order of 110° F. If yes, HELO is set (Block 462) and the program branches (Block 464) to the Hot Light routine (FIG.

16). If no, the program branches (Block 464) to the Hot Light routine without setting HELO.

Figure 16:
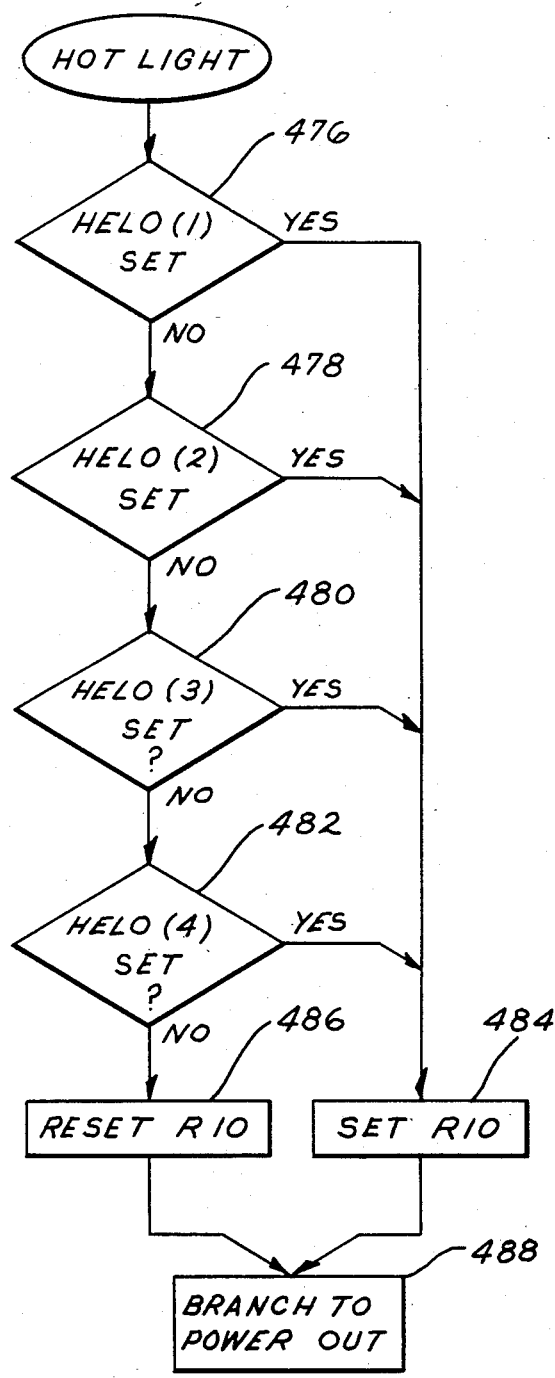
FIG. 16 is a flow diagram of the HOT LIGHT routine incorporated in control program for the microprocessor in the circuit of FIG. 8.

Referring now to FIG. 15G, if the OFF power setting is being implemented, this routine is entered at entry point HECDL (FIG. 15G) from Power Compare (FIG. 12). Inquiry 466 determines whether the count of HEC is zero. If it is, the program branches (Block 468) to the Hot Light routine (FIG. 16). If not, the count is effectively decremented by ½ count (Block 470). This decrements the HEC at an average effective rate of 64 counts per control period. Inquiry 472 determines whether the count has decreased below 256, the threshold count for HELO, which when set enables energization of the Hot Light. If not, the program branches (Block 468) to the Hot Light routine (FIG. 6). If the count is less than 256, HELO is reset (Block 474) and the program branches (Block 378) to the Hot Light routine (FIG. 16).

HOT LIGHT Routine (FIG. 16)

The function of this routine is to generate the output signal at output port R10 for controlling energization of the Hot Light. Output port R10 is coupled to LED 32 via driver circuit 120. It will be recalled that the Hot Light is to be energized if one or more of the heating elements is hot, indicated by the Heater Energy Counter.

Inquiries 476, 478, 480 and 482 check the state of the Hot Light Latch, designated HELO(n) for n=1–4. The n index associates each latch with one of heating elements 12–18 for n=1–4, respectively. If the answer is yes to any of these inquiries, R10 is set (Block 484), thereby energizing the Hot Light. If the HELO latches for all four heating elements are reset, indicating that the count of the Heater Energy Counter for each of the elements indicates a temperature less than the Hot Light threshold temperature, R10 is reset (Block 486), thereby deenergizing the Hot Light. The program then branches (Block 488) to the Power Out routine (FIG. 17).

POWER OUT Routine (FIG. 17)

The function of this routine is to generate the output signals at output ports R4 for controlling relay RL1. Inquiry 480 checks the state of the Power Out Latch (POL). If set, the output port R4 is set (Block 492). When R4 is set, relay contacts RL1(a) and RL1(b) are closed, enabling energization of heating element 12. If the POL is not set for heating element 12, output port R4 is reset (Block 494), thereby opening contacts RL1(a) and RL1(b) and deenergizing heating element 12. Having established the proper state for R4, the program branches (Block 496) to the HEC INDICATION routine (FIG. 18).

Figure 18:
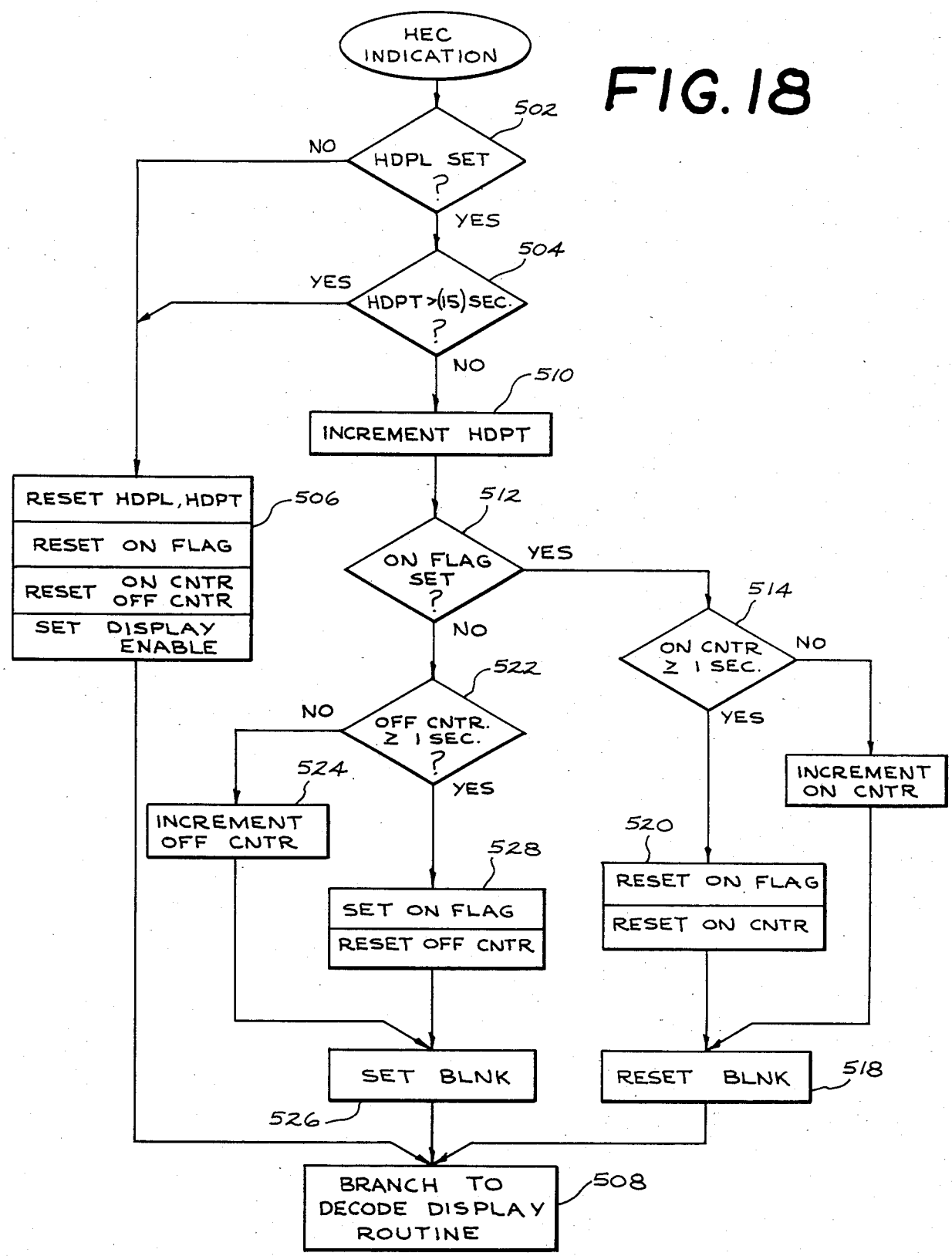
FIG. 18 is a flow diagram of the HEC INDICATION routine incorporated in the control program of the microprocessor in the circuit of FIG. 8.

HEC INDICATION Routine (FIG. 18)

This routine performs the function of the HDP Timer 110 (FIG. 6). It will be recalled that in the illustrative embodiment the display array is to be blinked on and off at a one hertz rate for a period of 15 seconds when the count of the heater energy counter indicates that its associated surface unit is at or very closely approaching its steady state temperature. This routine performs the timing for the blinking function.

Inquiry 502 checks the state of HDPL to determine whether the steady state level has been reached. If HDPL is set, a timer variable designated HDPT is checked (Inquiry 504) to determine if the display interval has timed out. If the display interval has timed out or HDPL is not set, the blinking function is not to be performed, in which case the HDPL and HDPT, the ON flag, the ON/OFF counters and the BLNK variable are reset (Block 506), and the program branches (Block 508) to the Display Decode Routine (FIG. 19A).

Figure 19:
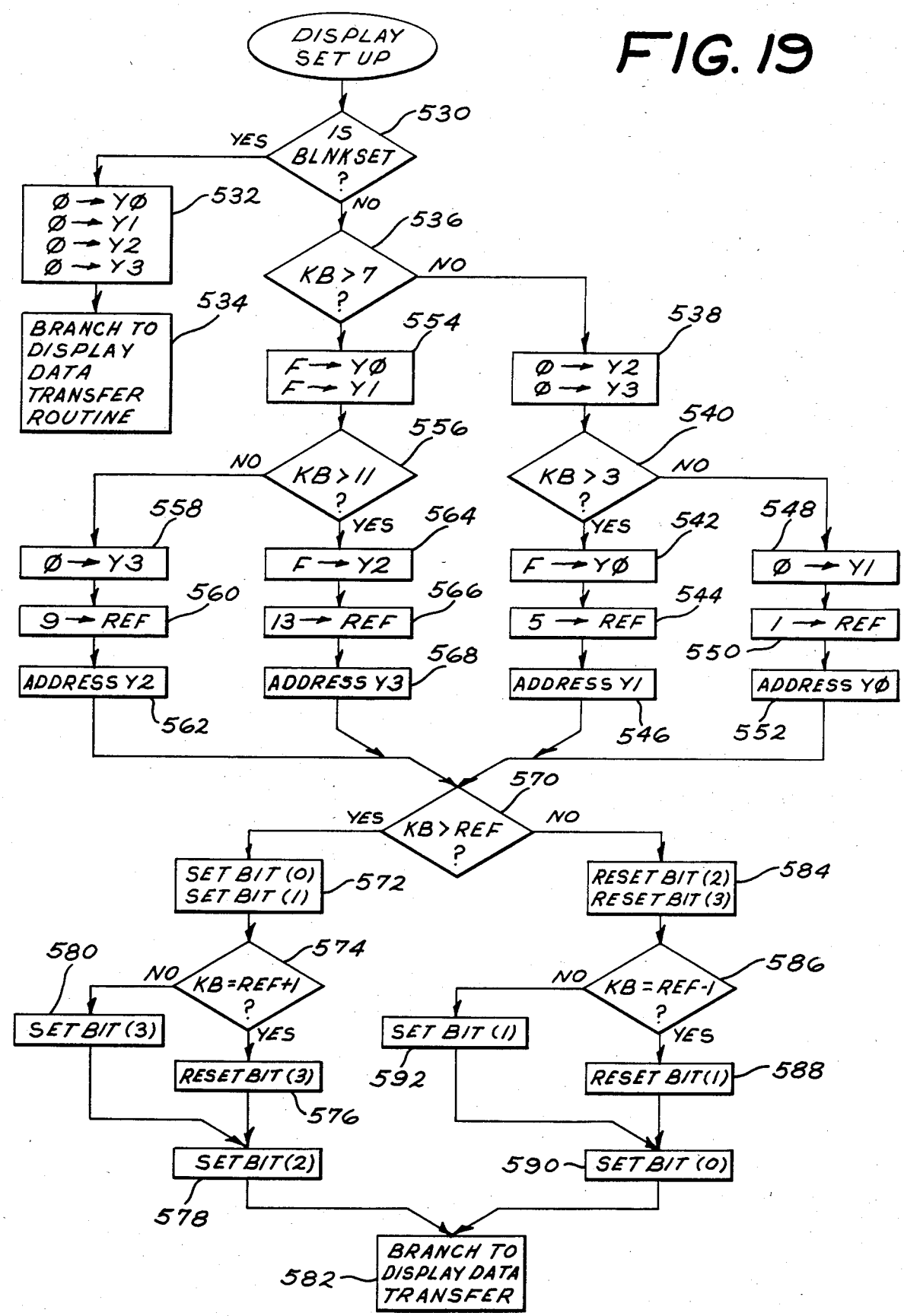
FIG. 19 is a flow diagram of the DISPLAY SET UP routine incorporated in the control program for the microprocessor in the circuit of FIG. 8.

When the HDPL is set and the display interval has not timed out, ON and OFF flags and counters designated ON CNTR and OFF CNTR are used to control the blinking rate. First HDPT is incremented (Block 510) and Inquiry 512 checks the state of the ON FLAG. If set, Inquiry 514 checks the ON CNTR to determine if the one second ON period has timed out. If not, ON CNTR is incremented (Block 516), a latch designated BLNK is reset (Block 518) and the program branches to the Display Set Up routine (FIG. 19). If Inquiry 514 determines that the one second interval on has timed out, the ON FLAG and the ON CNTR are reset (Block 520), BLNK is reset (Block 518) and the program branches to the Display Set Up Routine (FIG. 19). The BLNK latch is used in the Display Set Up routine to blink the display, when BLNK is reset the LEDs are energized, and when BLNK is set the LEDs are blanked.

Referring again to Inquiry 512, if the ON FLAG is reset, Inquiry 522 determines whether the 1 second OFF interval has timed out. If not, OFF CNTR is incremented (Block 524), BLNK is set (Block 526), and the program branches to the Display Decode Routine (FIG. 19). If Inquiry 522 determines that the OFF interval has timed out, the ON FLAG is set and the OFF CNTR is reset (Block 528), BLNK is set (Block 526) and the program branches to the Display Set Up Routine (FIG. 19).

DISPLAY SET UP Routine (FIG. 19)

As described with reference to FIGS. 1 and 3, the heat setting display for each surface unit is a linear array of 15 LEDs. The RAM file for each surface unit includes a set of four four-bit words addressed as Y0, Y1, Y2 and Y3, forming a four by four array of 16 bits as illustrated figuratively in FIG. 20. There is a one-to-one correspondence between these bits and outputs D1–D16, as shown in FIG. 20, for each of display driver circuits 126–129 (FIG. 9). The power setting display code is illustrated in Table III.

The function of this routine is to set the bits in the 16 bit array for each heating element to represent the selected power setting KB for the element in accordance with the code in Table III.

TABLE III

| | | | Power Setting Display Codes | | | |
|---|---|---|---|---|---|---|
| KB | Display Segment | Driver Output | Y0 | Y1 | Y2 | Y3 |
| 0 | — | D1 | 1000 | 0 | 0 | 0 |
| 1 | 1 | D2 | 1100 | 0 | 0 | 0 |
| 2 | 2 | D3 | 1110 | 0 | 0 | 0 |
| 3 | 3 | D4 | F | 0 | 0 | 0 |
| 4 | 4 | D5 | F | 1000 | 0 | 0 |
| 5 | 5 | D6 | F | 1100 | 0 | 0 |
| 6 | 6 | D7 | F | 1110 | 0 | 0 |
| 7 | 7 | D8 | F | F | 0 | 0 |
| 8 | 8 | D9 | F | F | 1000 | 0 |
| 9 | 9 | D10 | F | F | 1100 | 0 |
| 10 | 10 | D11 | F | F | 1110 | 0 |
| 11 | 11 | D12 | F | F | F | 0 |
| 12 | 12 | D13 | F | F | F | 1000 |
| 13 | 13 | D14 | F | F | F | 1100 |
| 14 | 14 | D15 | F | F | F | 1110 |
| 15 | 15 | D16 | F | F | F | 1111 |

As shown in Table III and illustrated in FIG. 9, output D1 of display driver circuits 126–129 is not used. The driver circuits have sixteen available outputs D1–D16. However, the display only has fifteen segments, one for each of the 15 non-OFF power settings. D1 was somewhat arbitrarily selected as the unused output. Hence, as shown in Table III, Display Segments 1–15 associated with power settings (KB) 1–15 are driven by driver outputs D2–D16 respectively. It will be appreciated that output D16 could have been the unused output just as well with appropriate software changes. Referring now to the flow diagram of FIG. 19, Inquiry 530 checks the state of the BLNK latch. If set, signifying that an OFF interval for the Blinking mode is in progress, the display array is to be blanked. All sixteen bits are set to zero by setting Y0–Y3 to zero (Block 532), and the program branches (Block 534) to the Display Data Transfer Routine (FIG. 20).

If BLNK is reset, the display is to be energized to display the selected power setting KB. A successive approximation technique is employed to set the sixteen bit array. Inquiry 536 determines if KB is greater than 7. If not, the 8 higher order bits (the bits of Y2 and Y3) are set to zero (Block 538) and Inquiry 540 determines if KB is greater than 3. If it is, the four lowest order bits (the bits of YØ) are set to one (Block 542) and a reference variable REF is set equal to 5 (Block 544). Word Y1 is addressed (Block 546) to appropriately encode its four bits, bit by bit.

Referring again to Inquiry 540, if KB is less than 3, Y1 is set to zero (Block 548); REF is set to 1 (Block 550) and YØ is addressed (Block 552) to encode its four bits, bit by bit.

Referring back to Inquiry 536, if KB is greater than 7, the eight lower order bits (the bits of YØ and Y1) are set to 1 (Block 554) and Inquiry 556 determines if KB is greater than 11. If not, the highest order four bits (43) are reset to zero {Block 558); REF is set equal to 9 (Block 560); and Y2 is addressed (Block 562) to appropriately encode its bits, bit by bit. If KB is greater than 11, the bits of Y2 are set to ones (Block 564); REF is set equal to 13 (Block 566) and Y3 is addressed (Block 568) to appropriately encode its four bits, bit by bit.

Having determined which of words YØ–Y3 must be encoded bit by bit the balance of the routine performs this function. Inquiry 570 compares KB to REF. If greater, the two lowest order bits are set to 1 (Block 572). Inquiry 574 compares KB to REF+1. If KB equals REF+1, bit (3) is reset (Block 576) and bit (2) is set (Block 578). If KB is not equal to REF+1, bit (3) is set (Block 580), and bit (2) is set (Block 578). The program then branches (Block 582) to the Display Data Transfer Routine (FIG. 21).

Returning to Inquiry 570 if KB is not greater than REF, the two highest order bits (bit (2) and bit (3)) are reset (Block 584). Inquiry 586 determines if KB equals REF−1. If so, bit (1) is reset (Block 588) and bit (0) is set (Block 590); if not, bit (1) is set (Block 592) and bit (0) is set (Block 590). The program then branches (Block 582) to the Display Data Transfer Routine (FIG. 21).

Figure 21B:
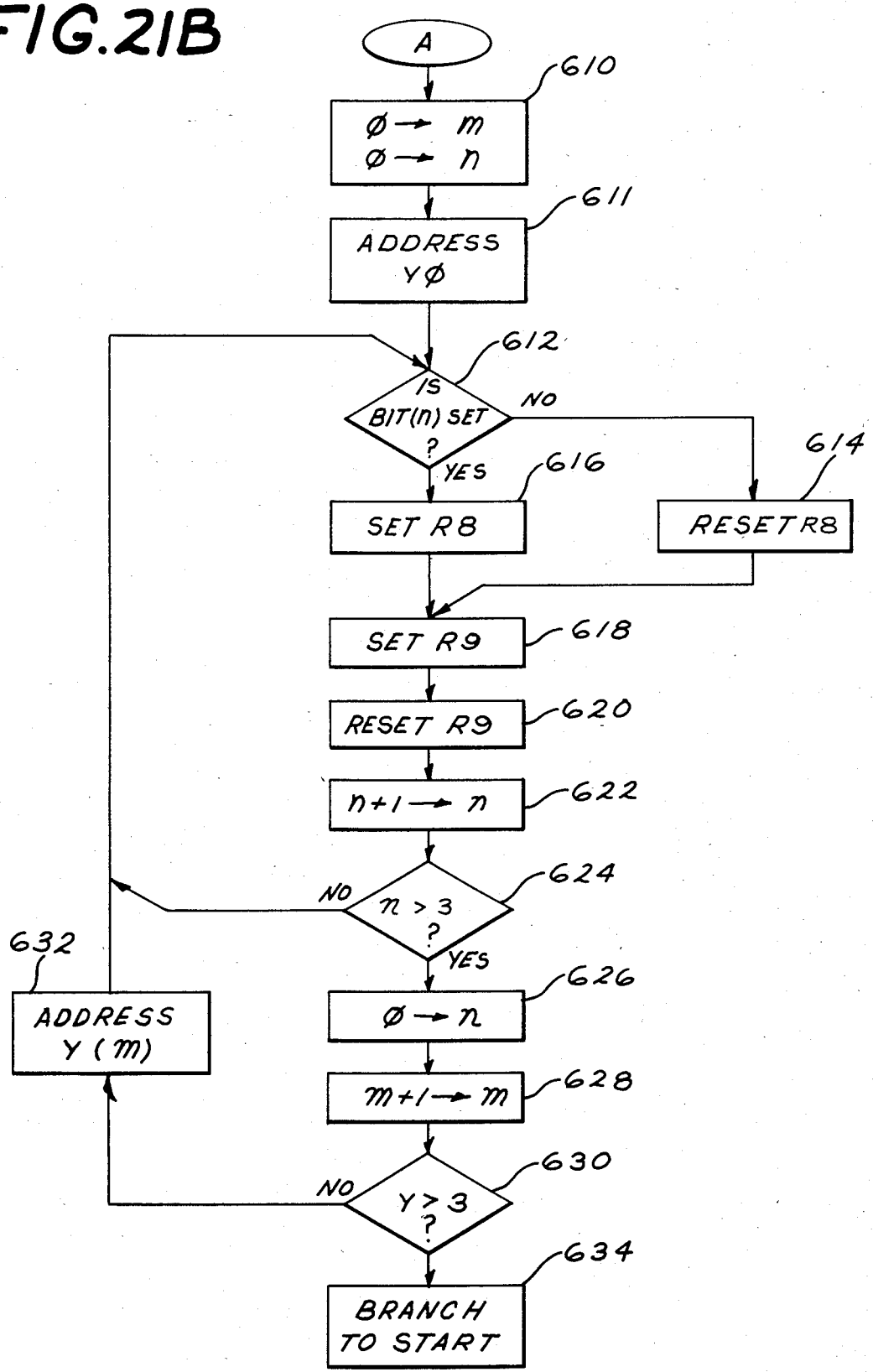

DISPLAY DATA TRANSFER Routine (FIGS. 21A and 21B)

The LED arrays are driven by driver circuits which are serial in parallel out devices. Hence, control information is read into the driver circuits sequentially. The function of this routine is to generate the data stream at output R8, the clock signals for reading in the data at output R9, and to enable the appropriate driver circuit via decoder 124 with enable signals generated at outputs R2 and R3 of microprocessor 102.

In order to generate the appropriate signals at R2 and R3 to enable the correct display driver circuit, the selected RAM file must be known. To this end, Inquiries 594, 596, and 598 determine which of RAM files 0, 1, 2 and 3 is presently in use by checking the value of the variable XRAM. Blocks 602, 604, 606, and 608 generate the appropriate enable signals at R2 and R3 for XRAM equal to 3, 2, 1 and 0 respectively.

With the correct display enabled by outputs R2 and R3 via decoder 124 (FIGS. 8 and 9), the program proceeds (entry point A, FIG. 21B) to decode the sixteen bit array set up in the Display Set Up routine (FIG. 19) to generate a data stream at R8 representing the states of these bits, and to generate clock signals at R9 to synchronize the reading of the data at R8 into the enabled one of driver circuits 126–129.

First the word and bit designating variables m and n respectively are initialized to zero (Block 610. Word YØ is addressed to begin with the first four bits (Block 611). Inquiry 612 determines the state of bit n. If not set, R8 is reset (Block 614); and if set, R8 is set (Block 616). Output R9 is set (BLock 618) to input the data from R8 to the enabled driver circuit, then reset (Block 620) to prepare for reading in the next bit. The bit identifier n is incremented (Block 622) and Inquiry 624 determines if n is greater than 3. If not, the program returns to Inquiry 612 to process the next bit. If n is greater than 3, signifying all four bits for the YØ column have been decoded, n is initialized to zero (Block 626) and m is incremented (Block 628) to address the next word. Inquiry 630 determines if m is greater than 3. If m is not greater than 3, word Y(m) is addressed to decode its bits (Block 632) and the program returns to Inquiry 612 to repeat the decode process. If m is greater than 3, all four columns have been decoded and the control program has been completed for one surface unit. The program then returns (Block 634) to the Start Routine (FIG. 11) to repeat the program for the next heating element.

While in accordance with the Patent Statutes, specific embodiments of the present invention have been illustrated and described herein, it is realized that numerous modifications and changes will occur to those skilled in the art. It is therefore to be understood that the appended claims are intended to cover all such modifications and changes as fall within the true spirit and scope of the invention.

What is claimed is:

1. An arrangement for monitoring and displaying the approximate temperature of a resistive heating element adapted for selective energization by a power signal from an external power supply at one of a plurality of power levels in response to selection by an operator of one of a plurality of power settings ranging from relatively low power settings, including an OFF setting, to relatively high power settings and displaying to the user that the element has reached the steady state power level associated with the selected power setting; the heating element having a temperature response characterized by a transient heat-up phase followed by a steady state phase when the power setting is changed from OFF to some power setting; and by a transient cool-down phase when the power setting is changed from a relatively higher power setting to a relatively lower power setting, the monitor and display arrangement comprising:

energy counter means for approximately tracking the heating element temperature;

counter control means operative to selectively increment said energy counter means at an increment rate which is approximately proportional to the rate of increase of the heating element temperature during the heat-up phase when operated at the selected power level, and to discontinue incrementing said energy counter means when said count at least equals a predetermined maximum count which is approximately proportional to the steady state heating element temperature for the selected power setting; said counter control means being further operative to decrement said energy counter means when the power setting selection is changed from a relatively higher power setting to a relatively lower power setting at a decrement rate which is approximately proportional to the rate of decrease of the heating element temperature during its cool-down phase, and to discontinue decrementing said energy counter means when said count is less than a predetermined maximum count which is approximately proportional to the steady state operating temperature of the heating element at the selected relatively lower power setting; and display means responsive to said counter control means operative to signify to the user that said count of said energy counter is closely approaching said predetermined maximum count for the selected power setting;

said display means comprising an array of display segmensts adapted to be selectively energized to form a plurality of patterns, each pattern representing a corresponding power setting, and circuit means for selectively energizing said display segments in that one of said plurality of patterns corresponding to the selected power setting, and means for intermittently interrupting energization of said display segments thereby creating a blinking effect during a period of predetermined duration, said period being initiated upon the occurrence of a predetermined count of said counter means, which count is a function of said predetermined maximum count for the selected power setting whereby blinking of said segments of said display means indicates to the user that the heating element has reached its steady state temperature for the selected power setting.

2. An arrangement for monitoring the approximate temperature of a resistive heating element adapted for selective energization by a power signal from an external power supply at one of a plurality of different power levels in response to selection by an operator of one of a plurality of power settings ranging from relatively low power settings, including an OFF setting, to relatively high power settings and displaying to the user that the heating element temperature approximately equals the steady state temperature corresponding to the selected power setting, the heating element having a temperature response characterized by a transient heat-up phase followed by a steady state phase when the power setting is changed from one relatively low lower setting including OFF to some relatively higher power setting; and by a transient cool-down phase when the power setting is changed form a relatively higher power setting to a relatively lower power setting, the arrangement comprising:

energy counter means for approximately tracking the heating element temperature;

counter control means operative to selectively increment said energy counter means at one of a plurality of increment rates, each of which is approximately proportional to the rate of increase of the heating element temperature during the heat-up phase when operated at a corresponding power level, said one increment rate being selected according to the selected power setting; discontinue incrementing said energy counter means when said count at least equals a selected one of a plurality of predetermined maximum counts each of which is approximately proportional to the steady state heating element temperature for corresponding power settings, said selected one maximum count being selected according to the selected power setting; decrement said energy counter means when the selected power setting is changed from a relatively higher power setting to a relatively lower power setting at one of a plurality of predetermined decrement rates, each of which is approximately proportional to the rate of decrease of the heating element temperature during the cool-down phase as the heating element temperature decreases from a relatively high operating temperature asaociated with the previously selected higher power setting to the relatively lower steady state operating temperature associated with the selected lower power setting; and discontinue decrementing said energy counter means when said count is less than that one of said predetermined maximum counts corresponding to the lower power setting; and indicator means responsive to said counter control means operative to indicate to the user that said count of said energy counter means is within a predetermined range of said predetermined maximum count corresponding to the selected power setting, said indicator means comprising an array of display segments adapted to be selectively energized to form a plurality of patterns, each pattern representing a corresponding power setting, and circuit means for selectively continuously energizing said display segments to form the pattern corresponding to the selected power setting upon selection of a power setting by the user; said circuit means further including means for intermittently interrupting energization of said display segments, thereby creating a blinking effect during a period of predetermined relatively short duration immediately following the occurrence of a predetermined count of said energy counter indicative of said heating element reaching its steady state temperature for the selected power setting. whereby the blinking of said pattern of display segments signifies to the user that the heating element temperature has approximately reached its steady state temperature for the selected power setting.

* * * * *